(12) United States Patent
Ragot et al.

(10) Patent No.: US 11,349,898 B2
(45) Date of Patent: May 31, 2022

(54) BITRATE ADAPTATION OF A VOICE-OVER-IP COMMUNICATION SESSION

(71) Applicant: ORANGE, Issy-les-Moulineaux (FR)

(72) Inventors: Stephane Ragot, Lannion (FR); Jerome Dufour, Chatillon (FR); Najmeddine Majed, Igny (FR); Minh Tri Vo, Chatillon (FR)

(73) Assignee: ORANGE

( * ) Notice: Subject to any disclaimer, the term of this patent is extended or adjusted under 35 U.S.C. 154(b) by 0 days.

(21) Appl. No.: 16/972,744

(22) PCT Filed: Jun. 3, 2019

(86) PCT No.: PCT/FR2019/051301
§ 371 (c)(1),
(2) Date: Dec. 7, 2020

(87) PCT Pub. No.: WO2019/234338
PCT Pub. Date: Dec. 12, 2019

(65) Prior Publication Data
US 2021/0258363 A1   Aug. 19, 2021

(30) Foreign Application Priority Data

Jun. 8, 2018 (FR) ...................................... 1855048

(51) Int. Cl.
*H04L 65/60* (2022.01)
*H04L 47/38* (2022.01)
*H04L 69/24* (2022.01)

(52) U.S. Cl.
CPC ............ *H04L 65/607* (2013.01); *H04L 47/38* (2013.01); *H04L 69/24* (2013.01)

(58) Field of Classification Search
CPC ... H04L 65/601; H04L 65/607; H04L 65/608; H04L 47/39; H04L 69/24
See application file for complete search history.

(56) References Cited

U.S. PATENT DOCUMENTS

| | | | |
|---|---|---|---|
| 2010/0232297 A1* | 9/2010 | Johansson | H04L 1/0003 370/241 |
| 2012/0004960 A1* | 1/2012 | Ma | H04L 69/16 705/14.4 |

(Continued)

FOREIGN PATENT DOCUMENTS

EP   2364541 A1   9/2011

OTHER PUBLICATIONS

Carlucci et al., "Making Google Congestion Control robust over Wi-Fi networks using packet grouping", DOI: http://dx.doi.org/10.1145/2959424.2959431, Jul. 16, 2016.

(Continued)

*Primary Examiner* — Jonathan A Bui
(74) *Attorney, Agent, or Firm* — David D. Brush; Westman, Champlin & Koehler, P.A.

(57) ABSTRACT

A method for adapting an encoding bitrate of real-time signals of a real-time communication session between sender devices and receiver devices of communication terminals. A sender device includes a multi-bitrate encoder using a set of discrete bitrates. The method includes a test step of increasing the encoding bitrate at the sender device by transmitting at least one redundant packet according to selected transmission parameters. A method is also provided for determining a request to adapt the encoding bitrate of real-time signals in order to implement a test of increasing the encoding bitrate at the sender device by transmitting at least one redundant packet according to selected transmission parameters. A sender device and a receiver device (Continued)

implementing the methods are provides as well as a terminal containing these devices.

10 Claims, 10 Drawing Sheets

(56) References Cited

U.S. PATENT DOCUMENTS

| | | | |
|---|---|---|---|
| 2013/0195119 A1* | 8/2013 | Huang | H04L 65/608 370/468 |
| 2013/0246643 A1* | 9/2013 | Lu | H04N 21/8455 709/231 |
| 2018/0014041 A1* | 1/2018 | Chen | H04L 65/4084 |
| 2018/0309688 A1* | 10/2018 | Sarker | H04L 65/1033 |
| 2020/0112721 A1* | 4/2020 | Tsilimantos | H04N 19/159 |

OTHER PUBLICATIONS

"IMS Profile for Voice, Video and SMS over untrusted Wi Fi access", Official Document IR.51, Version 6.0, GSM Association, May 1, 2018.
"IMS Profile for Voice and SMS", Official Document IR.92, Version 12.0, GSM Association, May 2, 2018.
J. Rosenberg et al., "SIP: Session Initiation Protocol", Network Working Group, Request for Comments: 3261, Memo, Jun. 2002.
H. Schulzrinne et al., "RTP: A Transport Protocol for Real-Time Applications", Network Working Group, Request for Comments: 3550, Memo, Jul. 2003.
H. Schulzrinne et al., "RTP Profile for Audio and Video Conferences with Minimal Control", Network Working Group, Request for Comments: 3551, Memo, Jul. 2003.
M. Handley et al., "SDP: Session Description Protocol", Network Working Group, Request for Comments: 4566, Memo, Jul. 2006.
D. Singer et al., "A General Mechanism for RTP Header Extensions", Network Working Group, Request for Comments: 5285, Memo, Jul. 2008.
F. Andreasen, "Session Description Protocol (SDP) Capability Negotiation", Internet Engineering Task Force (IETF), Request for Comments: 5939, Sep. 2010.
"3rd Generation Partnership Project; Technical Specification Group Services and System Aspects; IP Multimedia Subsystem (IMS); Multimedia Telephony; Media handling and interaction (Release 15)", 3GPP TS 26.114 V15.2.0 (Mar. 2018).
"AMR-WB-interoperable modes", 3GPP TS 26.445 V14.2.0 (Annex A), Release 14 (Dec. 2017).
English translation of the Written Opinion of the International Searching Authority dated Sep. 26, 2019 for corresponding International Application No. PCT/FR2019/051301, filed Jun. 3, 2019.
International Search Report dated Sep. 19, 2019 for corresponding International Application No. PCT/FR2019/051301, filed Jun. 3, 2019.
Written Opinion of the International Searching Authority dated Sep. 19, 2019 for corresponding International Application No. PCT/FR2019/051301, filed Jun. 3, 2019.

* cited by examiner

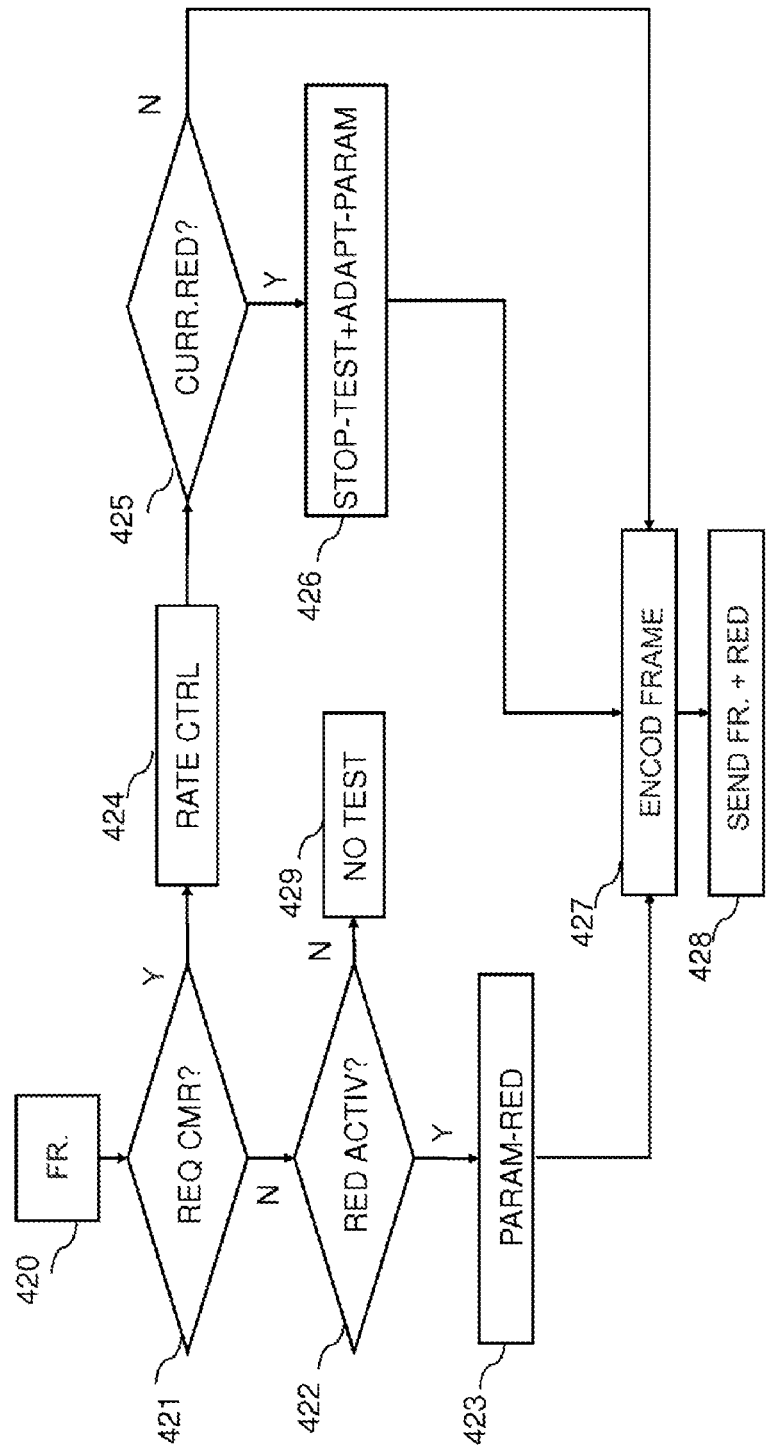

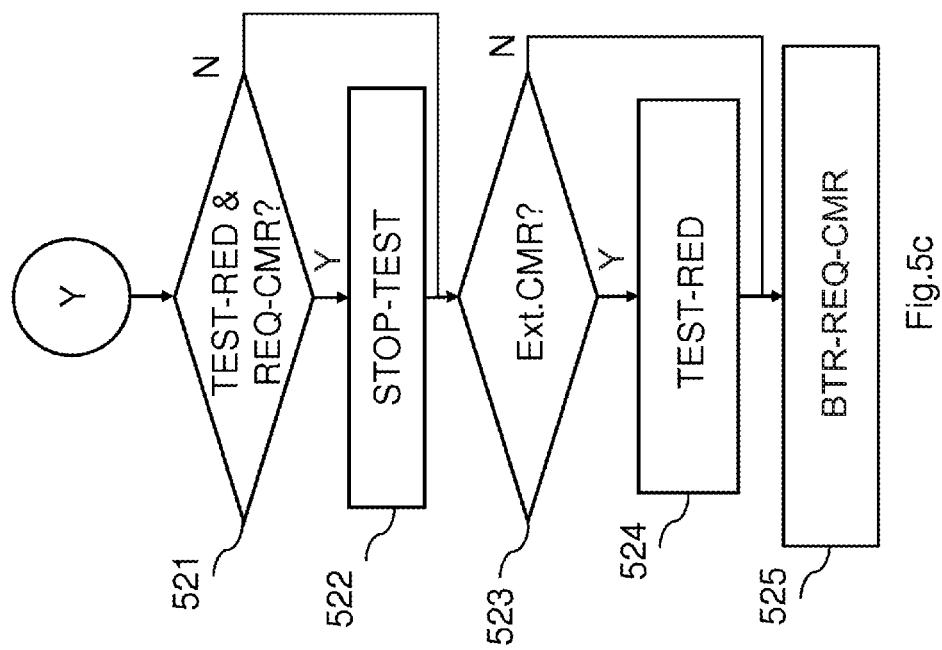

BITRATE ADAPTATION OF A VOICE-OVER-IP COMMUNICATION SESSION

CROSS-REFERENCE TO RELATED APPLICATIONS

This application is a Section 371 National Stage Application of International Application No. PCT/FR2019/051301, filed Jun. 3, 2019, the content of which is incorporated herein by reference in its entirety, and published as WO 2019/234338 on Dec. 12, 2019, not in English.

FIELD OF THE DISCLOSURE

The present invention relates to the field of telecommunications, and more particularly to the field of packet-switched communication networks. In this type of network, it is possible to route data streams associated with real-time services.

The Internet Protocol, called IP, developed by the IETF, for "Internet Engineering Task Force", is implemented on packet-switched communication networks to support both non-real-time services, such as data transfer services, looking up web pages, electronic messaging, and real-time or conversational services, such as telephony over IP, video telephony over IP or even video broadcasting over IP.

The invention relates more particularly to adapting the encoding/decoding bitrate of real-time signals such as voice or video signals during a real-time communication session between two communication terminals.

This bitrate adaptation and the related mechanisms are suitable for the transmission of digital signals, such as audio-frequency signals (speech, music or the like), but they apply to other real-time signals, such as video.

BACKGROUND OF THE DISCLOSURE

One example of an existing voice over IP communication system is described with reference to FIG. 1. This figure describes a bidirectional voice over IP (VoIP) communication system with two telephony terminals (100 and 150) connected by an IP packet-switched network (125). The "signaling plane" is not shown in this figure, but the possible solutions for establishing and managing calls may be based on various known protocols, such as for example:
  SIP/SDP (for "Session Initiation Protocol/Session Description Protocol") in accordance with the IETF RFC 3261 and RFC 4566 specifications—as in multimedia services on IMS (for "IP Multimedia SubSystem"). To facilitate signaling exchanges on the media capacities and the associated offers/responses, it is also possible to use "SDPcapneg" in accordance with the IETF RFC 5939 specification.
  JSEP (for "JavaScript Session Establishment Protocol"), which uses SDP syntax to define WebRTC session descriptions (with an exchange via WebSocket or another means).

FIG. 1 is a simplified view of the "media plane" and of the audio chain used when the call is established between 2 terminals (100 and 150) connected by an IP network (125). There is a limit here to the case of a mono audio signal, and the ambient acoustic signal is captured for example by a microphone (101 and 151) on each side of the communication. It will be noted that the case of a mono input/output signal may easily be generalized to a multichannel case in which a plurality of microphones and/or loudspeakers are used. Likewise, microphones and loudspeakers could be replaced with cameras and screens in the case of video signals.

The remote signal is rendered on a loudspeaker (102 and 152). The audio signals that are captured and rendered generally undergo various pre-processing/post-processing operations at sending and at reception (103 and 153) such as for example:
  At sending: analog-to-digital conversion, gain control, noise reduction, echo cancellation, etc.
  At reception: digital-to-analog conversion, gain control, etc.

The audio signal preprocessed at sending is encoded in successive frames—typically with a frame length of 20 ms—this length is generally between 10 to 60 ms for conversational applications. The encoded frames are formatted as IP packets (104 and 154). The packets are typically transported by the RTP (for "Real Time Protocol") protocol, described in the IETF RFC 3550 specification; this protocol is located above the IP/UDP (for "User Datagram Protocol") transport protocols. It will be noted that the UDP protocol may be replaced with another transport protocol, for example with TCP (for "Transmission Control Protocol") in order in particular to facilitate the traversing of networks with network address translation NAT, proxies or firewalls.

At reception (105 and 155), the packets are received in a jitter buffer aimed at compensating the variations in the reception times, and the signal is decoded (by compensating any frame losses), and finally the reconstructed signal is post-processed (103 and 153) and rendered.

Communication is assumed here to be bidirectional, and the communication system thus forms a looped system with feedback. The feedback may be conveyed in two ways:
  "Out-of-band" (that is to say contained in packets that form an additional stream with respect to the RTP media stream). The RTCP (for Real-Time Control Protocol) protocol is typically used as feedback channel. RTCP allows transmissions of control packets in separate packets of the RTP stream. It is recalled that RTCP packets may have a substantial size and therefore result in a non-negligible additional bitrate; in addition, the possible packet loss may be problematic, because if RTCP is used for adaptation, the feedback that is conveyed may be lost. The sending of packets using the RTCP protocol may be discontinuous and non-repetitive, which may make the adaptation less reactive and dependent on network conditions (transmission delay, packet losses, etc.). In general, the application should support and use the AVPF (for "Audio Video Profile with Feedback") RTP profile in order for RTCP to actually be usable for media adaptation. In addition, voice over IMS applications at present only allow the AVP (for "Audio Video Profile") profile, which restricts the use of RTCP; media adaptation in terminals—if used—may be based on "monitoring" network conditions, including the information contained in the RTCP RR (Receiver Report) reports about packet loss or jitter that are sent on average every 5 seconds.
  "In-band" (that is to say in the RTP media stream). This type of feedback may be considered more robust than RTCP because it is possible to repeat one and the same request in a plurality of successive packets. It should be noted that, in some situations (call waiting, listening to voicemail, etc.), it is possible for the RTP packets to be sent in just one direction, however it is assumed here that there is bidirectional sending of RTP packets so that the feedback works. One example of in-band signaling is the use of a CMR (for "Codec Mode Request") field used to transmit an encoding adaptation request.

In general, several types of degradation may potentially affect the quality of voice over IP:
variable bandwidth/network congestion
packet loss, desequencing and repetition
packet delay (transmission, queuing, processing, etc.), delay variation (jitter)
clock drift between terminals There are various solutions for mitigating these different degradations, including adaptation solutions in terminals. There are two types of adaptation in VoIP terminals: sender-based adaptation and receiver-based adaptation. There are also variants in which the adaptation decision is assisted or taken by the network, but this case is not dealt with here because it goes beyond the scope of the invention.

In the case of a "sender-based" adaptation, in order for the sender to be able to make an optimal end-to-end adaptation decision, it must receive feedback from the remote receiver indicating the quality perceived at the end of the chain, with for example indicators such as the observed loss rate or the available bandwidth estimated by the remote receiver.

In the case of a "receiver-based" adaptation, the adaptation decision is made by the remote receiver (155) and transmitted by feedback to the local sender (104) (for example the choice of the mode or bitrate to use)—this feedback is transmitted via the remote sender (154) and then the local receiver (105).

FIG. 1 indicates this feedback through dotted arrows for the direction from the receiver 155 to the sender 104. Of course, this feedback may take place in the other communication direction, with feedback from the receiver 105 to the sender 154 via the blocks 104 and 155; this opposite direction is not shown in FIG. 1 so as not to overload this figure.

What is of more particular interest here is a bitrate adaptation in order to overcome for example bandwidth changes and network congestion.

In one example of adaptation solutions, in order to control a bandwidth variation or network congestion, the techniques described below may be implemented.

When a codec operates at a fixed rate, one adaptation solution for modifying the effective bitrate on the network is that of varying the number of consecutive signal frames in a packet ("frame bundling") and thus varying the packet rate and the relative bitrate of the IP/UDP/RTP protocol headers (and the lower layers).

When a codec is multi-rate, is it also possible to change the bitrate of the codec. This bitrate change may be performed on the basis of the available bandwidth estimated by the remote receiver and received through feedback ("sender-based" decision) or on the basis of a bitrate change request received through feedback ("receiver-based" decision).

FIG. 2 describes an advanced example of bitrate control of a multi-rate codec called iSAC (for "Internet Speech Audio Codec"). The iSAC codec is a proprietary codec developed by GIPS (Global IP Solutions). The iSAC source code has been available in the Google Chromium™ open source WebRTC project since 2011.

The codec operates in two different modes:
Wideband (WB) mode encodes an audio band from 0 to 8 kHz with a frame length of 30 or 60 ms.
Super Wideband (SWB) mode encodes an audio band from 0 to 12 kHz or from 0 to 16 kHz with a frame length of 30 ms.

The bitrate of the iSAC codec is variable; the average bitrate may range from 10 to 32 kbit/s in wideband mode and from 10 to 56 kbit/s in super wideband mode. The iSAC codec is able to operate in two transmission modes on the channel:
"Channel Adaptive"
"Channel Independent"

The "Channel Adaptive" mode takes into account the bandwidth estimates made at reception by the iSAC decoder and makes it possible to adapt the encoding bitrate, whereas the "Channel Independent" mode simply follows a target bitrate.

In comparison with FIG. 1, the audio processing blocks (103 and 153) and the network (125) have been intentionally omitted from FIG. 2 in order to simplify the figure. The audio capturing and rendering elements (blocks 101, 102 and 151, 152) may be seen.

The encoding bitrate (blocks 201, 251) is adapted in the iSAC codec (blocks 202, 252) based on the downlink bitrate indication, estimated at the receiver (blocks 205, 255).

Specifically, the receiver (blocks 205, 255) estimates the bandwidth available in the downlink direction upon each reception of packets from the following information:
size of the packet (payload);
arrival time;
sequence number;
RTP sending time.

The estimated bitrate is then made available to the sender via a shared structure (blocks 207 and 257). The sender (blocks 204, 254) sends a field called BEI (for "Bandwidth Estimate Index") whose values range from 0 to 23 in order to indicate the available bandwidth estimated by the receiver; the BEI field indicates an estimated available bandwidth value ("bottleneck") from among values defined between the minimum and maximum target bitrates of the iSAC codec (from 0 to 11 in WB mode and from 0 to 23 in SWB mode). The BEI field is decoded at the other end of the chain (blocks 203, 253).

It will also be noted that the bandwidth estimate in the iSAC codec is also accompanied by an estimate of the jitter, which is not described here but which is used to estimate the size of the padding described later on; the estimated jitter is represented on 1 bit to indicate a low or high value, and it is transmitted in the BEI field in WB mode (0 if the BEI is between 0 and 11 and 1 if it is between 12 and 23) or encoded in the binary train (payload of the current frame) in SWB mode.

For the transmission direction from 200 to 250, the bitrate adaptation is implemented on the sender side. The encoding performed at 201 has a bitrate updated by the block 202 based on a BEI field decoded at 203. This decoded field was encoded at 254 based on an available bandwidth estimate made by block 255 of the receiver 155.

The transmission in the other direction takes place in the same way, with the corresponding blocks.

A padding method using random bits, at the end of the packet, is performed in order to test whether it is possible to increase the encoding bitrate ("bandwidth probing"). This simple method specifically makes it possible to artificially increase the size of certain packets at sending (210 or 260 respectively) in order to be able to estimate, at the end of the reception chain (205 or 255 respectively), whether the bandwidth available on the transmission channel allows use of a bitrate higher than the current bitrate. It will however be noted that this method uses random bits with no usefulness other than for the bandwidth test.

The size and the decision to send the bit padding are determined using a rate model. At the start of the call (typically the first 10 seconds), the bitrate is kept to a minimum bitrate. Three consecutive packets containing padding bits are then sent in order to test the channel, with a maximum interval of typically 500 ms. The size of these consecutive packets is fixed so that the instantaneous bitrate associated with the packet i is given by $(1+\gamma_i) R_i$, where $R_i$ is the estimated available bandwidth for packet i and the adaptive term $\gamma_i$ (of higher value >0) is calculated "heuristically". The principle is that of sending regular bitrate peaks ("bursts") on the channel in order to test a bitrate increase with respect to the current bitrate.

The rate model implemented in blocks 210 and 260 is based on a bottleneck model limiting the bandwidth available in the network. This rate model is based on a plurality of internal states defined at the receiver, including binary detection of bandwidth overuse by the last packet received with a measurement of the time elapsed since the last detected bandwidth overuse (in ms), as well as information on the queue modeling the "bottleneck" (number of packets still to be transmitted, increase in the delay).

The bitrate estimate performed at the receiver is generally effective in reducing the encoding bitrate, that is to say detecting that the available bandwidth is lower than the current bitrate and that the bitrate should be lowered. By contrast, the method of padding using random bits in order to check that the current bitrate is able to be increased is not optimal, in fact it introduces random bits that are not used and not checked. On the other hand, the iSAC codec produces an average bitrate that is able to be adjusted relatively finely between a minimum bitrate and a maximum bitrate (for example 10 to 32 kbit/s or 10 to 56 kbit/s), whereas a multi-rate codec operating in accordance with a defined set of discrete bitrates, such as an AMR, AMR-WB or EVS codec, does not work over a continuous range of bitrates.

Furthermore, the bitrate adaptation method for the iSAC codec, using a bitrate estimate at reception and a channel test using bit padding, assumes the use of a field specific to the iSAC codec (BEI). This specific field does not exist for other types of codec, in particular for multi-rate AMR, AMR-WB and EVS codecs. It will be noted that the CMR field of the AMR, AMR-WB and EVS codecs is different from the BEI field of the iSAC codec, because one (BEI) represents information on the available bandwidth estimated at the receiver and assumes "sender-based" adaptation, and the other (CMR) makes it possible to encode an adaptation request indicating a maximum bitrate and assumes a "receiver-based" adaptation.

Another more advanced method—using the same principles—of estimating available bandwidth and adapting the encoding bitrate is described in the article "Making Google Congestion Control robust over Wi-Fi networks using packet grouping" by G. Carlucci, L. De Cicco, S. Holmer, S. Mascolo, published in ACM, IRTF & ISOC, Applied Networking Research Workshop, 2016. This article describes how the GCC (for "Google Congestion Control") algorithm operates for video congestion control; the GCC adaptation algorithm is divided into two parts: a sender part and a receiver part. The GCC algorithm assumes the use of the AVPF RTP profile to send RTCP REMB (RTCP message for Receiver Estimated Maximum Bitrate) messages every second or as soon as the estimated bandwidth has dropped by 3%.

The sender part is based on the loss rate ("loss based"). It transmits, in the headers of the RTP packets, absolute sending times called "abs-send-time", which are used to estimate the bandwidth available in the receiver part. It uses the RTCP REMB reports indicating the estimated bitrate $A_r$, and the frame loss $f_r$ observed by the remote receiver to adapt the encoding bitrate: the target encoding bitrate $A_s$ is respectively increased, maintained or decreased when the loss rate is negligible, low or high:

$$A_s(i) = \begin{cases} (1-0.5f_l)A_s(i-1) & \text{if } f_l > 0.1 \\ 1.05 A_s(i-1) & \text{if } f_l < 0.02 \\ A_s(i-1) & \text{otherwise} \end{cases}$$

The actual encoding bitrate is obtained as $\min(A_s, A_r)$, that is to say the minimum between this target encoding bitrate and the last available bandwidth value estimated by the remote receiver (received by RTCP).

The receiver part is based on the variation in the unidirectional delay ("delay-based"). It uses a finite state machine with 3 states (decrease, maintain, increase) and an estimate at reception of the available bandwidth using Kalman filtering. The bandwidth estimate is based on a model of the variation in the unidirectional delay ("one-way delay"), defined as $$d_m(i) = (t_r(i) - t_r(i-1)) - (t_s(i) - t_s(i-1))$$

Where $t_s(i)$ and $t_r(i)$ are the sending times (according to the "abs-send-time" information sent in the RTP header) and reception times of the packet i, in the form of two components:

$$d_m(i) = m(i) + n(i)$$

Where m(i) is the variation in the queue delay—estimated using Kalman filtering—and n(i) is network jitter—considered to be noise.

Overuse of the available bandwidth is detected by applying an adaptive threshold to the estimated variation in the queue delay m(i) in order to control the transitions between the 3 states. The bitrate estimate at reception is adapted according to the states:

Decrease: $A_r(i) = \alpha R(i)$ where $\alpha \in [0,85, 0,95]$ and R(i) is the bitrate measured over the last 500 ms Maintain: $A_r(i) = A_r(i-1)$ Increase: $A_r(i) = \eta A_r(i-1)$ where $\eta \in [1,005, 1,3]$ This adaptation method uses heuristics for adaptation, and it assumes that it is possible to adapt the bitrate finely with multiplicative factors (1.05 and $\eta$) specific for the bitrate increase. It is difficult to apply to voice codecs such as EVS, which are multi-rate with a set of discrete bitrates. For example, the ratio between successive bitrates for the codec ranges from 1.11 to 1.5 for the EVS codec with fixed bitrates from 7.2 to 128 kbit/s. Furthermore, the use of RTCP packets (of REMB type or the like) is not always possible in VoIP applications restricted to an RTP profile such as AVP (for Audio Video Profile, defined in IETF RFC 3551), which limits the benefit of RTCP for adaptation purposes.

For current VoLTE (for "Voice over LTE (Long Term Evolution)") telephony applications, denoting a voice transport technique on 4G LTE mobile telephony networks specified in GSMA IR.92 and VoWifi (for "Voice over Wi-Fi") telephony applications, denoting a technique for transporting voice over the Wi-Fi network specified in GMSA IR.51, encoding adaptation mechanisms are described in chapter 10 of the 3GPP TS 26.114 specification (use of a=bw-info, ECN, ANBR, definition of CMR and RTCP-APP, etc.) with general recommendations but no adaptation obligation in the service. One example of an (informative) adaptation algorithm for VoIP is described in Annex C of the TS 26.114 specification. In practice, only the AVP RTP profile is authorized, and adaptation for voice over IMS is at present rarely authorized and configured by mobile network operators, who prefer to dimension the service with a guaranteed fixed bitrate (GBR for "Guaranteed Bit Rate").

In addition, the TS 26.114 specification contains recommendations (see clause 7.5.2.1.6) on the initial encoding bitrate (ICM for "initial codec mode") to be used at the start of a call in order to avoid link congestion and that it is recommended—if no bitrate control information has been received for a certain period of time—to gradually increase the encoding mode (bitrate) at most to the value of the ICM corresponding to the authorized encoding bitrate; if no poor quality is detected or in the absence of bitrate control information, it is recommended for the sender to increase its bitrate in progressive increments with a certain waiting time of the order of 500-600 ms. This adaptation approach is highly heuristic. The bitrate increase is based on switching to the immediately higher encoding mode, with monitoring of the quality indicators or waiting for a request to be received by the receiver (typically CMR or RTCP-APP) in order to validate the bitrate increase. This method is not optimal because it relies on increasing heuristics in gradual increments and leads to abrupt bitrate change jumps with "blind testing" of the bitrate increase.

SUMMARY

There is thus a need for an encoding/decoding bitrate adaptation method that overcomes the abovementioned drawbacks.

To this end, the invention proposes a method for adapting an encoding bitrate of real-time signals of a real-time communication session between sender devices and receiver devices of communication terminals, a sender device comprising a multi-bitrate encoder using a set of discrete bitrates. The method is such that it comprises a test step of increasing the encoding bitrate at the sender device by transmitting a current frame and at least one copy of a previous frame with a chosen offset.

Testing the bitrate increase using at least one copy of a previous frame, also called "redundant packets" below, makes it possible to increase the bitrate without abrupt jumps, since the transmission parameters are able to be defined so as to avoid blindly testing the higher discrete bitrate and risking degrading the quality without being able to compensate the consequences of a direct bitrate increase. This test step makes it possible to check whether the available bandwidth is sufficient.

In addition, the redundancy of the packets may be used for example to correct any frame losses if the bitrate increase is not justified and if it creates a congestion problem. The redundant packets are then used both to test the bitrate increase and to correct frame losses.

According to one embodiment, the test step is implemented for as long as no bitrate adaptation request is received from a receiver device.

Thus, when the receiver device implements a bandwidth estimate, it may inform the sender device of a change to a higher or lower bitrate. In both cases, the test stops in order to perform the requested bitrate change.

In one particular embodiment, the test step is implemented after a bitrate change to the lower discrete bitrate.

This process thus makes it possible to modulate the bitrate increase even further (less abrupt increase), but it may however introduce degradations into the transmitted signal.

In one embodiment, the test step is implemented when a time delay has reached a threshold since the last adaptation request received from a receiver device.

Thus, if the encoding bitrate has not been adapted for a certain time, then a bitrate increase is undoubtedly possible and an increase test is then appropriate.

In one embodiment, the time delay for triggering the increase test is adapted on the basis of information on available bandwidth estimated at the receiver device.

Thus, depending on the state of the network and the available bandwidth, it is possible to define a shorter time to attempt a bitrate increase if for example the available bandwidth tends to increase or, on the other hand, to define a longer time when the estimated bandwidth tends to decrease.

In one possible embodiment, the test step is implemented on the basis of obtained information on the evolution of the encoding bitrate.

If the trend of the evolution of the encoding bitrate is more downward, then there is no need to perform an increase test on the encoding bitrate.

In one advantageous embodiment, the information on the evolution of the encoding bitrate is obtained from a history of available bandwidth estimated at the receiver device.

Thus, the various estimates of available bandwidth at a receiver device make it possible to obtain a trend of the evolution of this estimate and to deduce therefrom information on the evolution of the available bandwidth.

In another embodiment, the test step is implemented after reception of an adaptation request received from a receiver device and comprising a request to transmit redundant packets according to selected transmission parameters.

Thus, in this embodiment, it is the receiver device that determines the relevance of the implementation of a test step according to the bandwidth estimates made. The adaptation request is determined for example at the receiver device, on the basis of the estimated available bandwidth.

The present invention also targets a method for determining a request to adapt the encoding bitrate of real-time signals of a real-time communication session between sender devices and receiver devices of communication terminals, a sender device comprising a multi-bitrate encoder using a set of discrete bitrates. The method is such that it comprises a step of estimating an available bandwidth for a receiver device and of constructing an adaptation request to be transmitted to a sender device and comprising a request to implement a test step of increasing the encoding bitrate by transmitting a current frame and at least one copy of a previous frame with a chosen offset.

Thus, from a bandwidth estimate made at a receiver device of a terminal, the latter is able to determine whether it is relevant to perform a test step at a sender device in order to increase the encoding bitrate. An adaptation request is then constructed accordingly.

The invention also targets a sender device of a communication terminal able to implement real-time communication sessions and comprising a multi-bitrate encoder using a set of discrete bitrates. The sender device is such that it comprises a packet transmission unit able to implement a test step of increasing the encoding bitrate by transmitting a current frame and at least one copy of a previous frame with a chosen offset.

This device has the same advantages as the adaptation method described above that it implements.

The invention also targets a receiver device of a communication terminal able to implement real-time communication sessions and comprising a multi-bitrate encoder using a set of discrete bitrates. The device is such that it comprises an estimation module able to estimate an available bandwidth and a module for constructing and transmitting an adaptation request, able to construct and transmit, to a sender device, a request to implement a test step of increasing the encoding bitrate by transmitting a current frame and at least one copy of a previous frame with a chosen offset.

This device has the same advantages as the method for determining an adaptation request described above that it implements.

The invention also targets a communication terminal comprising a sender device as described and/or a receiver device as described.

The invention targets a computer program comprising code instructions for implementing the steps of the adaptation method as described and/or the steps of the method for determining a request as described when these instructions are executed by a processor.

The invention relates lastly to a storage medium, able to be read by a processor, storing a computer program comprising instructions for executing the adaptation method as described and/or the steps of the method for determining a request as described.

BRIEF DESCRIPTION OF THE DRAWINGS

Other features and advantages of the invention will become more clearly apparent on reading the following description, given purely by way of nonlimiting example and with reference to the appended drawings, in which:

FIGS. 4a to 4c illustrate, in the form of flowcharts, the steps of a method for adapting an encoding bitrate in a first embodiment of the invention;

DETAILED DESCRIPTION OF ILLUSTRATIVE EMBODIMENTS

Figure 3:
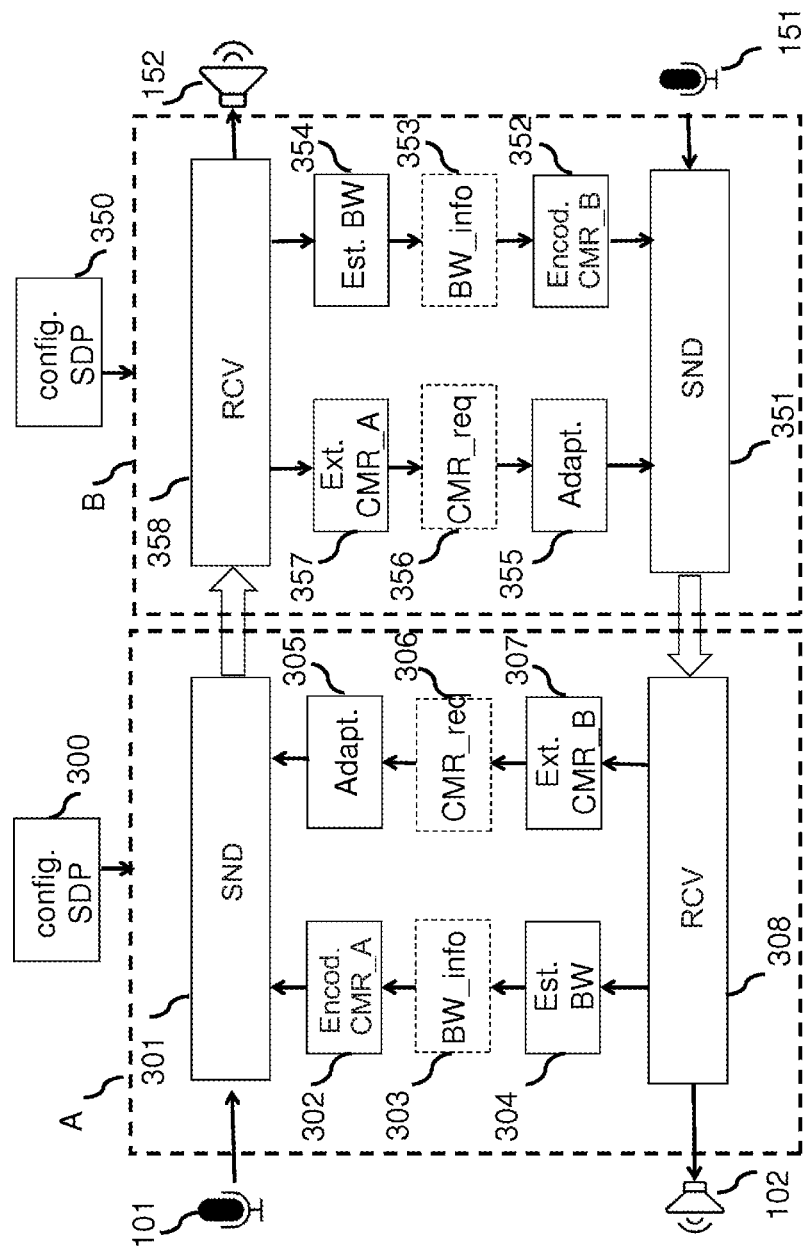
FIG. 3 illustrates one embodiment of a voice over IP communication system according to one embodiment of the invention.

With reference to FIG. 3, a bidirectional communication system with bitrate adaptation and use of redundancy according to one embodiment of the invention is now described.

Figure 1:
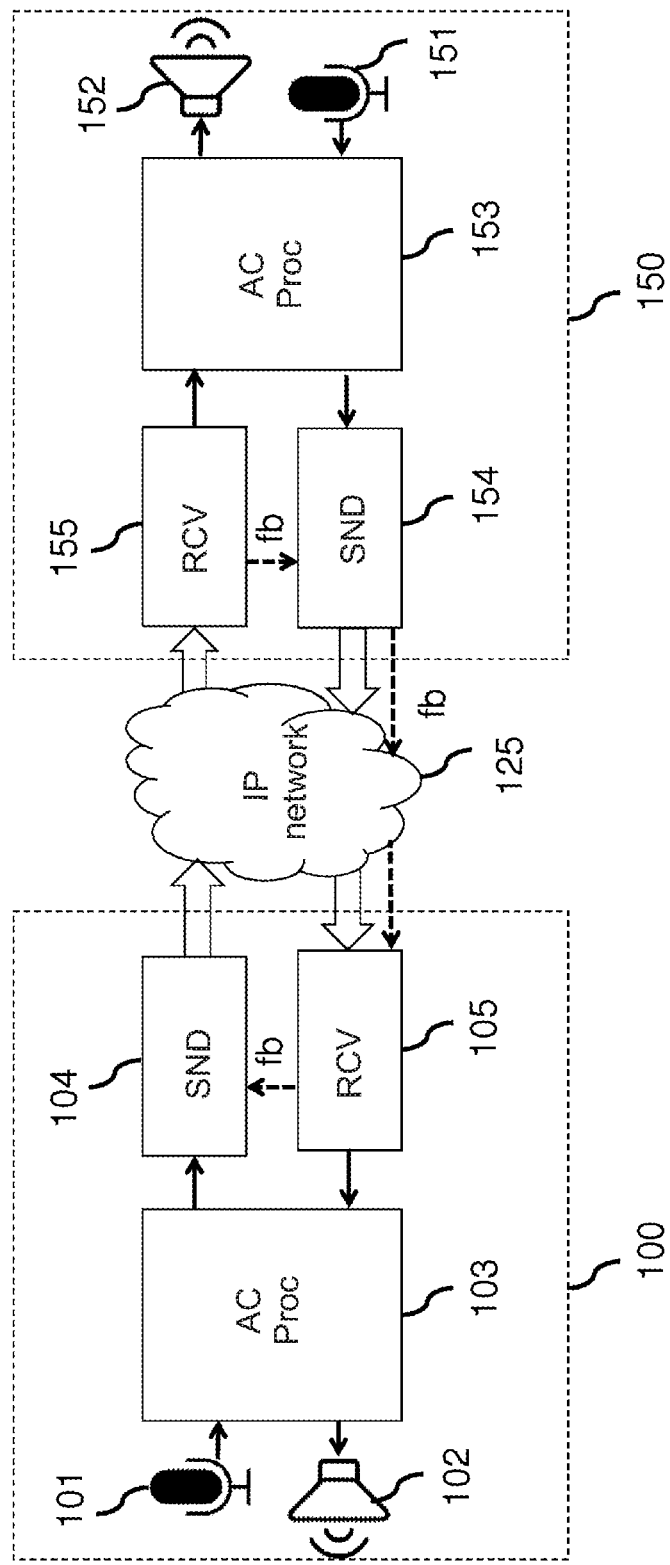
FIG. 1 illustrates a VoIP communication system known from the prior art and described above.
Figure 2:
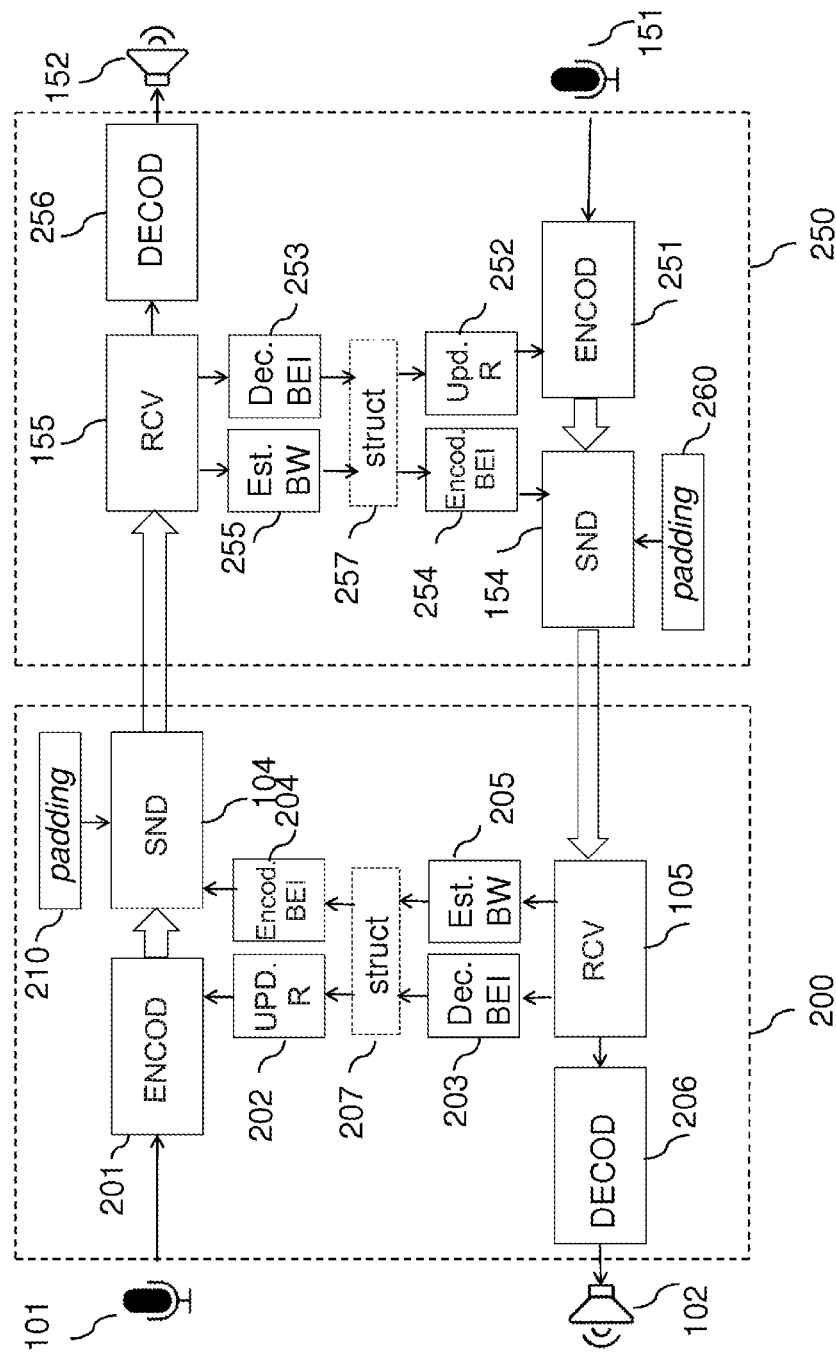
FIG. 2 illustrates a bitrate adaptation method known from the prior art and used with the iSAC codec described above.

The communication is performed between 2 terminals A and B. The audio capturing and rendering elements (blocks 101, 102 and 151, 152) already presented with reference to FIG. 1 may be seen. Without loss of generality, it is assumed here that the encoding is performed using the EVS codec restricted to the "EVS Primary SWB" modes over a range of possible bitrates ranging from 9.6 to 128 kbit/s. In some variants of the invention, the EVS codec could be used over a more restricted bitrate range, for example from 9.6 to 24.4 kbit/s, or a possible change of audio band could be considered, with fixed bitrates for example from 7.2 (NB+WB) to 24.4 (NB+WB+SWB) kbit/s using the maximum encoded band at each bitrate. In some variants, it is also possible to use other codecs, such as for example AMR or AMR-WB over a bitrate range ranging respectively from 4.75 to 12.2 kbit/s (for AMR) and 6.6 to 23.85 kbit/s (for AMR-WB).

The encoding bitrate at the sender (blocks 301, 351) is adapted according to the invention by preferably using in-band signaling to indicate the adaptation requests with a CMR field present in the payload of the packets for the EVS codec. This type of in-band signaling is robust—in the sense that it is able to be repeated in successive RTP packets if necessary—and does not depend on the constraints on the sending times of packets for RTCP. For codecs not having a CMR field in their payload, it is possible in some variants to define a field of equivalent functionality or to use out-of-band signaling using RTCP (for example RTCP REMB); it is assumed hereinafter that the adaptation request signaling takes place in-band using CMR.

It is assumed that, when the call is established, the RTP payload of the EVS codec is configured with a "header-full" mode (hf-only=1) and a systematic CMR (cmr=1). The reader is referred to the specification of the RTP payload of EVS in the specification 3GPP TS 26.445 Annex A for the definition of the SDP parameters (cmr, hf-honly, etc.) and also regarding the "packetization" modes (Compact or Header-Full) of the EVS codec. It is recalled that the CMR code called NO_REQ of the EVS codec indicates that the CMR does not contain a request, and therefore that the CMR information may be ignored; this therefore makes it possible to send packets without a request, even when the sending of the CMR is systematic. In some variants of the invention, it will be possible to use other SDP configurations, such as cmr=0 (sending CMRs on demand, only when a CMR has to be sent) or hf-only=0 (use of Compact mode except when Header-Full mode is necessary, for example when a redundant frame is added to the current packet).

Moreover, in one preferred embodiment, it is assumed that discontinuous transmission (DTX), in which the inactive frames are transmitted on average every 160 ms by silence descriptors (SID for Silence Description), is deactivated by the SDP parameter dtx=-1 of the EVS codec. This makes it possible to ensure continuous testing of the bandwidth on the channel. However, in some variants of the invention, the DTX mode will be activated for the EVS codec, which means that the invention will be applied only in the active signal periods, since it is not relevant to modify the discontinuous transmission mode of SID frames in order to preserve maximum efficiency of the DTX mode when this is activated. It is recalled that, for the AMR and AMR-WB codecs, it is not possible to control the DTX mode at SDP level, and so this DTX mode is always activated by default.

When the negotiation of the call uses the SDP protocol, this being the case in the embodiments described here, the use of redundancy at the application level ("application layer redundancy") depends on the SDP parameter "max-red". Typically, the "max-red" parameter gives the maximum duration (in ms)—at the sender—between the transmission of a frame (called primary frame) and the transmission of a redundant version; this parameter therefore makes it possible to set a maximum delay when redundancy is used. For example, "max-red=20" indicates that it is possible to use redundancy and that a redundant frame may be transmitted up to 20 ms after the original frame. In general, when "max-red" is set to 0, this is tantamount to deactivating the use of redundancy, and if "max-red" is not present as a signaling parameter (SDP attribute), this indicates that there is no limit on the use of redundancy—as long as the overall bandwidth specified by the parameter SDP "b=AS:" in accordance with IETF RFC 4566 and the encoding modes authorized in the session are complied with. It is assumed here that the SDP parameter "max-red" is not defined or that its value is sufficient to be able to apply the invention (for example max-red=220).

The receiver (blocks 308 and 358) receives the successive RTP packets. As soon as a new packet is received, the CMR field—if present—is extracted (blocks 307 and 357) and the content of this CMR field is written—except in the case of "NO-REQUEST" (NO_REQ) or if the CMR field is not present—to a structure called "CMR_Req" in 306 and 356, which is shared between the sender and the receiver in one and the same terminal. In one exemplary embodiment, the CMR_Req structure will comprise a plurality of entries:
  a Boolean entry called "updated", which indicates whether a new CMR has been received (taking the values "true" or "false")
  an entry called "requested_bitrate", which indicates the (maximum) encoding bitrate requested in the CMR It will be noted that blocks 307 and 357 are entitled "Ext. CMR_A/B" in order to cover the general case of an extended CMR request used in the second embodiment; in the first embodiment, the CMR request will be a conventional request.

In some variants, these entries may be supplemented with other information such as "requested_bandwidth" in order to indicate the requested encoded audio band (NB, WB, SWB, FB) in the CMR, and entries called for example "activate_ca_mode"/"ca_fec_mode"/"ca_offset" in order to respectively control the activation of "channel-aware mode" and the parameters of channel-aware mode ("FEC mode" having the value LO or HI and "offset" having the value −1, 0, 2, 3, 5 or 7).

In one typical embodiment, the sender and the receiver are executed in parallel (for example in different execution queues or "threads"); this shared structure is then necessary, and this structure is typically accessed in a critical section with the use of a mutex to manage parallel access.

The CMR field to be sent is constructed and encoded by the CMR field encoding modules 302 and 352. The received CMR field is extracted by the extraction modules 307 and 357. The CMR field may be either, according to a first embodiment of the invention, a conventional CMR field with codes defined for codecs such as AMR, AMR-WB or EVS or, according to a second embodiment of the invention, an extended CMR field as described later in the second embodiment. In this second embodiment, an extended CMR is used to indicate the activation of redundant transmission.

In the preferred embodiment, use of the EVS codec is restricted to Primary SWB mode in order to simplify the description. The encoding and sending parameters adapted according to the invention are in this case the encoding bitrate and the use of 100% redundancy. In some variants, more sending parameters could be considered for the adaptation, for example bandwidth (NB, WB, SWB or FB) in the case of the EVS codec—if the bitrate range used for the adaptation also allows the encoded band to be changed —, the type of redundancy (for example partial redundancy, or redundancy greater than 100%).

Redundancy is defined here as a transmission mode with repetition of encoded frames at the application level, as described in chapter 10 of specification 26.114. Consideration is given more particularly to the use of what is called 100% redundancy, which means that the current packet contains the payload of the current frame and the payload of a previous frame shifted by a predetermined offset. This type of redundancy is thus tantamount to (approximately) doubling the instantaneous transmission bitrate (assuming that the bitrate of the current frame and that of the redundant frame are identical) by copying a previous packet in a one-off manner, in one embodiment.

The reader is referred to chapter 10 of the 3GPP TS 26.114 specification for illustrations of cases of redundancy with the AMR, AMR-WB and EVS codecs, where the encoded frame N is repeated in a following packet with a distance called "offset" and denoted K here. When K=1, the packet N contains the frame N and the previous frame N−1, whereas when K=2 the packet N contains the frame N and the frame N−2 as well as an empty frame (NO_DATA). For a larger offset K, the number of empty frames (NO_DATA) "inserted" between the current frame of index N and the redundant frame of index N−K is K−1. It will be noted that it is possible to combine redundancy with the aggregation of frames, but this case is not described here (see 3GPP TS 26.114 FIGS. 10.12 and 10.13).

According to the invention, the sending parameters (bitrate, activation of redundancy) are provided by block 305, 355 to the encoder/sender (block 301, 351), which applies these parameters when encoding and transmitting the next encoded frame (or the next encoded frames) until a new CMR request is received.

It is assumed here that the initial encoding bitrate is set to the lowest bitrate authorized in the session, assuming that there is no quality of service (QoS) guarantee. However, in some variants, this initial bitrate may be defined as the maximum authorized bitrate (if there is information on a guaranteed bitrate "GBR") or a predetermined intermediate bitrate between the minimum bitrate and the maximum bitrate.

Upon reception of a new RTP packet, a bandwidth estimate is performed (blocks 304 and 354). In one embodiment, this estimate will be similar to the estimate performed in the iSAC codec based on information on the last packet received (having kept the history of the analysis performed based on the previous packets):
  size of the packet (RTP payload excluding protocol headers)
  arrival time
  sequence number (RTP field)
  timestamp (RTP field)

This available bandwidth estimate is performed each time a new RTP packet is received by the receiver. In some variants, it is possible to use an estimate different from the estimate of the bandwidth at the receiver, for example the estimate of the GCC congestion control algorithm, or other methods of estimating the available bandwidth from the same information on the reception of packets or derived information, such as estimated loss rate or estimated jitter.

It is assumed here that the history of the estimated bandwidth upon reception of the packets over a predetermined duration, for example 500 ms, including the packet that has just been received, is stored in block 304 and 354, and that a shared structure called "BW_info" at 303 and 353 is defined in order to be able to communicate to the sender that a new CMR should be sent and the information associated with this CMR. In one exemplary embodiment, the structure "BW_info" comprises the following entries:
  a Boolean entry called "updated", which indicates whether a new CMR will need to be sent (taking the values "true" or "false")

an entry called "requested_bitrate", which gives the encoding bitrate corresponding to the available bandwidth estimated by the receiver In some variants of the invention, it will be possible to supplement these entries with additional information in order to construct a CMR request to change the encoded audio band, to activate the "channel-aware mode" of the EVS codec. In the second embodiment, the structures "BW_info" and "CMR_Req" will also comprise a field called "burst_uplink" associated with an extended CMR request, as explained later in the second embodiment.

From the history of available bandwidth estimated at 304, 354, it is possible to take into account not only the instantaneous value of the bandwidth (updated when the last packet is received), but also its trend over the time horizon defined by the history (here for example 500 ms). It is considered here by way of example that the trend of the evolution of the available bandwidth is estimated through simple linear regression. It is thus possible to calculate the slope of the linear model y=f(x), where x is the arrival time of the packets (in seconds or ms) and y is the estimated available bandwidth. This slope (also called directional coefficient) is given for example analytically in the form: $\Sigma(x_i-\bar{x})(y_i-\bar{y})/\Sigma(x_i-\bar{x})^2$ where $(x_i, y_i)$ are the reception time and the estimated bandwidth upon reception of the packet i, $\bar{x}$ and $\bar{y}$ are the averages of $x_i$ and $y_i$ over the time horizon under consideration. In some variants, it is possible to use robust linear regression variants, with regularization according to the L1 or L2 norm. In some variants, it is also possible to use a trend estimate derived from the available bandwidth estimate (which is possible for example if Kalman filtering is used as in the GCC algorithm).

Before encoding the next frame, the extracted request is read and converted (blocks 305 and 355) into encoding/sending parameters, which are listed below:

the encoding bitrate to be used the use of 100% redundancy

It should be noted that the size of the RTP payload is often slightly greater than the "net payload" associated with the encoding bitrate. For example, for EVS encoding with a "Header-full" transport mode and with a systematic CMR (hf-only=1, cmr=1), two bytes are systematically added to the encoded frame in order to form the payload.

An additional overhead may also be present in a transmission context, such as for example with WebRTC technology, in which RTP header extensions are used, thereby adding additional bytes to the RTP packets. For example, for voice communication, 12 bytes may be added to the RTP header if the following configuration is used:

A "one-byte" header extension in accordance with RFC 5285 (with a preamble 0xBEDE on 2 bytes and a length field indicating "length=2" on 2 bytes to signal that 2 types of extension are added), for a subtotal of 4 bytes.

A "one-byte" extension on 2 bytes, of the type:
a=extmap:1 urn:ietf:params:rtp-hdrext:ssrc-audio-level A "one-byte" extension on 4 bytes, of the type:
a=extmap:3 http://www.webrtc.org/experiments/rtp-hdrext/abs-send-time Padding of 2 null bytes.

In another configuration, a single type of extension (for example the above "ssrc-audio-level" extension) could be used, which would add only 8 additional bytes.

If this additional bitrate is not taken into account (subtracted from the size of the RTP packet) in the available bandwidth estimate at the receiver, this is tantamount to testing a bitrate higher than the current encoding mode. Thus, the bandwidth actually used for a given frame (without 100% redundancy) will be biased toward a higher encoding bitrate value, because of the additional bytes in the RTP header if the RTP headers are only taken into account after estimating bandwidth. In the preferred embodiment, this bias will be eliminated by giving the estimate of available bandwidth (block 304, 354) only the size of the payload without the RTP headers. In some variants of the invention, there will be provision not to eliminate this bias, and it will be assumed that the receiver will compensate this bias before forming the CMR to be sent.

A first embodiment is first of all presented in which the sender and the receiver act in a coordinated manner and in which the decision to activate redundancy is taken by the sender based on information on the reception of CMR and the current bitrate. The current bitrate is in particular used to check whether it corresponds to the maximum bitrate authorized in the session, in which case redundancy is not activated. According to this first embodiment, the sender decides to test the channel by sending packets with redundancy, after a certain delay before triggering a bitrate increase test. In a first embodiment, consideration is given first of all to the case where each packet resulting from this test contains redundancy. In another more optimized embodiment, the redundancy will be sent only intermittently in order to limit the average bitrate peak caused by the channel test. In this first embodiment, the initiative to decide on redundancy returns to the sender.

It is recalled that the "normal" logic of the CMR field for AMR, AMR-WB and EVS codecs is to indicate that a maximum bitrate indicated by the CMR should not be exceeded; according to the invention; the sender therefore normally has to comply with this constraint, which is particularly important in cases of interoperability with mobile systems in circuit-switched mode, which may have a maximum encoding bitrate (for example 12.65 kbit/s for AMR-WB) lower than that authorized in voice over LTE (for example 23.05 kbit/s). Thus, in order to retain interoperability with other systems (including interoperability gateways), provision will be made in this first embodiment to define an SDP parameter "adapt", the purpose of which will be to check that the two communicating terminals are indeed compatible with the invention. In this case, the logic of the CMR field may be modified in order to allow the sender to temporarily exceed the limit imposed by the last CMR received, in order to test a bitrate increase (which by nature does not comply with the maximum bitrate constraint of the last CMR received). If a terminal implementing the invention communicates with another terminal that is not compatible with the SDP parameter "adapt", the invention cannot be used because it assumes that the remote terminal uses CMR to send a bitrate corresponding to an estimated bandwidth at reception, which would not be the case.

In this embodiment, when the available bandwidth estimated at the receiver is different from the current bitrate observed by the receiver (based on the last packet received), a CMR is sent to change the bitrate. This approach is in particular sufficient to reduce the bitrate, because the bandwidth estimate according to the prior art generally works well enough to detect that the current bitrate should be lowered when it exceeds the capacity of the channel. Specifically, at the onset of congestion, the receiver will observe an increase in the queue delay or in the loss rate. However, when the current bitrate is less than the available bandwidth, the bandwidth is generally underestimated if a bitrate increase test is not implemented.

Thus, in order to be able to increase the bitrate, the sender, according to the invention, sends packets containing redundancy to test the channel. If losses are caused by this bitrate increase, they may be compensated by redundancy. Using redundancy makes it possible to test the channel before actually increasing the bitrate and to proactively compensate induced losses.

In this embodiment, the following adaptation parameters are set and define the characteristics of the redundancy packets or "bursts" according to a following example of values:
- (maximum) redundancy duration: $L_{burst}$=100 (defined as a number of frames);
- redundancy offset: $K_{burst}$ (its value is set to a value >0, for example to 2, during redundancy, and it has a value of −1 when redundancy is deactivated), it will be seen later that the offset may also take a value that will be a function of a redundancy sending frequency parameter;
- elapsed time ("timer") since the last CMR received: $T_{CMR}$ reinitialized at 0 upon each reception of CMR (with a given bitrate, other than NO_REQ);
- delay for triggering the redundancy bitrate increase test: $T_{burst}$ (defined as a number of frames) set at 250
- adjustment factor controlling the delay for triggering the test: $f_{burst}$ (its value is adapted but reinitialized at 1.0);
- parameter for adapting the factor $f_{burst}$: $\varphi_{burst}$=1.5.

In some variants, other values may be assigned to the above parameters.

Figure 4A:
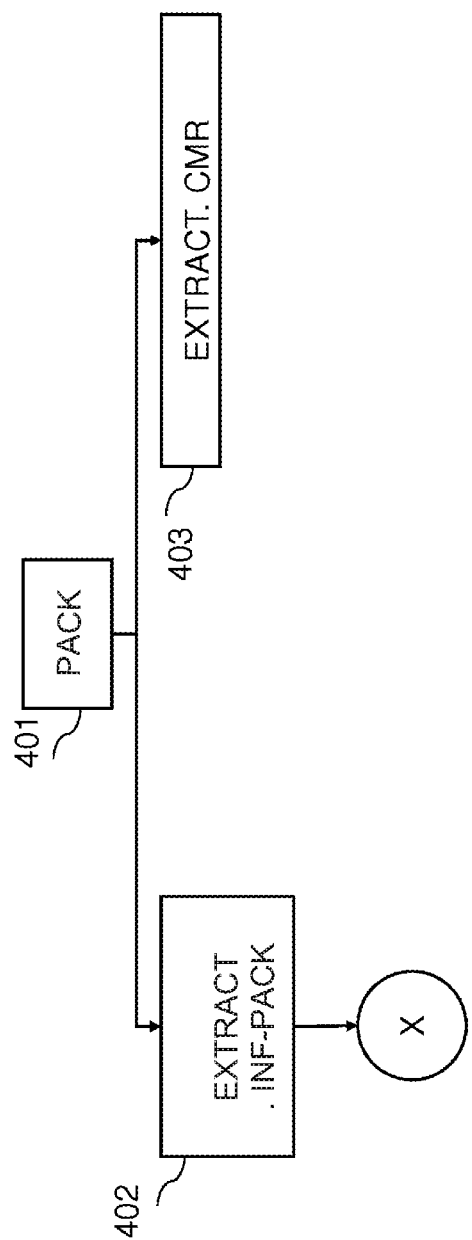
Figure 4B:
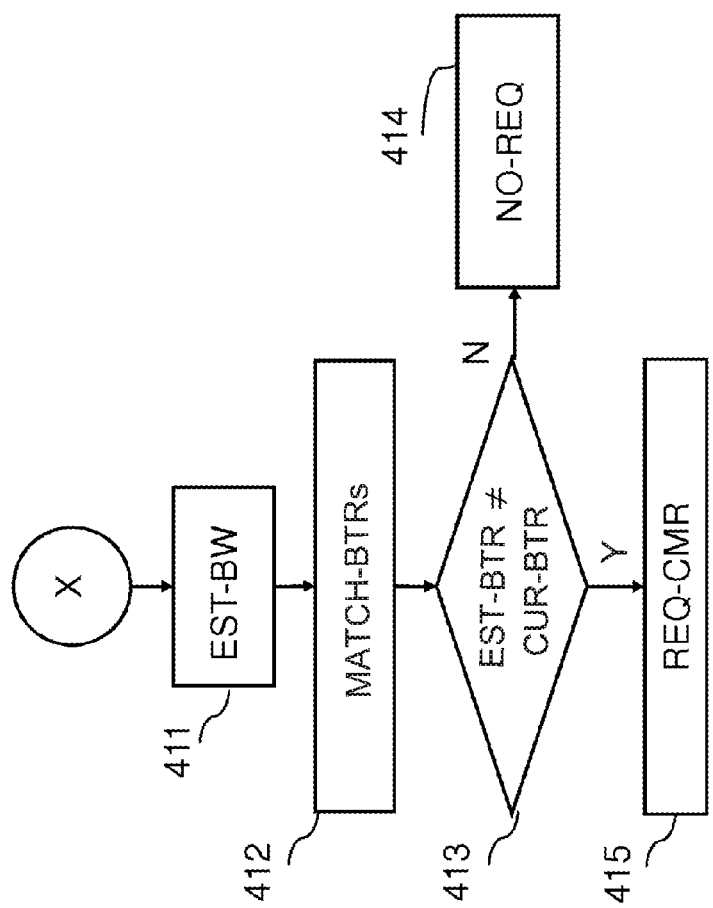

FIGS. 4a, 4b and 4c show one exemplary implementation of a bitrate adaptation method with redundancy according to the invention in the form of flowcharts, implemented in a bidirectional system.

FIG. 4a shows the steps implemented by the receiver according to a first embodiment of the invention, upon reception of a packet.

In this embodiment, the communication is bidirectional and the following steps may be applied in both terminals.

Upon reception of a packet (in 401), two types of information are extracted:
- transmission information for the current packet, allowing estimation of the available bandwidth (at 402) according to one of the estimation methods described above. The extraction of this information is followed by the steps X described with reference to FIG. 4b;
- information on the type of adaptation requested from the CMR request sent by the other end of the communication (at 403). The extracted CMR is indicated in the shared structure "CMR_req", in particular in order to signal that a new CMR has been received if this is present and different from NO_REQ. The "updated" entry of the CMR_Req structure is set to the value "true" when a CMR (other than NO_REQ) has been extracted.

It is recalled that, for the EVS codec, the CMR field is encoded on one byte called "CMR byte" and that it is constructed from 3 fields: H (1-bit "header"), T ("type" on 3 bits) and D ("data" on 4 bits) according to tables A.2 and A.3 of Annex A of the 3GPP TS 26.445 specification. It is therefore possible to extract the requested bitrate $D_{CMR}$ and possibly other encoding parameters (such as the encoded band) by decoding the CMR (if this is received and other than the value NO_REQ corresponding to T=111 and D=1111 in binary).

No description is given here of the steps known to those skilled in the art, which consist in extracting the headers (CMR and ToC for "Table of Content" fields if present), in demultiplexing and decoding the encoded frames from the payload of the received packet for the EVS codec. In particular, in the event of packet losses, the possible redundancy will be used by the receiver to correct losses if the lost current frame has been duplicated in another packet with a given offset.

FIG. 4b describes the steps X implemented at the receiver after extracting the information on the current packet (402). The bandwidth is estimated using one of the methods described above (at 411). Next, mapping between the estimated bandwidth and the discrete EVS bitrates is performed (at 412) in order to determine whether there is a need to change the current reception bitrate and whether it is possible to change from one discrete bitrate to another.

In the preferred embodiment, this mapping is implemented using the pseudo-code given in Annex 1 in order to obtain the bitrate D from the available bandwidth B.

In some variants, this mapping could be modified by taking for example the discrete higher or lower bitrate of the EVS codec closest to the estimated bandwidth.

If the estimated bitrate is equivalent to the current bitrate (N at 413), no bitrate information (block 414) is written to the shared structure "BW_info" and the "updated" entry of this structure is set to the value "false". If the estimated bitrate is different from the current bitrate (Y at 413), the necessary information (the value of the "requested-bitrate" entry) is written to the shared structure "BW_Info" in step 415 so that the sender is able to encode the CMR with the next frame to be sent, also setting the value of the "updated" entry to "true". A conventional request to change the bitrate to a corresponding discrete bitrate will then be constructed and encoded as in the case of an EVS codec from the prior art.

FIG. 4c describes the steps, implemented at the sender (including the encoder), of a method for adapting an encoding bitrate according to a first embodiment of the invention.

Upon receiving a new signal frame to be encoded (step 420), the sender checks whether a CMR has been received in the shared structure "CMR_Req" at 421 (by checking whether the "updated" entry has changed to "true"). If this is the case, it adapts the encoding and sending parameters (at 424), if a CMR containing an adaptation request exists, then it sets the value of the "updated" entry of the structure CMR_Req to "false". Additionally, if a CMR was received with a requested bitrate different from the current encoding bitrate, a CMR reception indication is stored in memory and the frame counter from the last received CMR is reset to 0 ($T_{CMR}$=0) in step 424.

At 425, it is checked whether a bitrate increase test with redundancy is in progress, by checking whether $N_{burst} \geq 0$. If this is the case (Y at 425), then this test is deactivated at 426. The redundancy parameters are reinitialized at 426, with $N_{burst}$=−1 ($N_{burst}$ representing the number of frames with redundancy still to be transmitted) and $K_{burst}$=−1. In addition, the delay for triggering the bitrate increase test is adapted depending on the bitrate adaptation requested in the CMR request.

Thus;
If the current encoding bitrate is higher than the received CMR ($R_s > R_{CMR}$), the receiver asks to lower the bitrate. It is then decided to increase the time delay for triggering a bitrate increase test. To this end, the adjustment factor is increased by setting $f_{burst} = f_{burst} + \varphi_{burst}$. The time delay for triggering a test is, as explained later, dependent on the factor $f_{burst}$ according to the following formula:

$$\tau_{CMR} = f_{burst} \tau_{burst}$$

If not, the remote receiver asks to increase the bitrate ($R_s < R_{CMR}$) and it is chosen to reduce the time delay for triggering a bitrate increase test by adapting the factor according to the formula $f_{burst}=f_{burst}/\varphi_{burst}$. It is also possible to add a minimum time interval condition with for example the additional step: $f_{burst} \leftarrow \max(f_{burst}, 0.15)$.

This adaptation logic follows the AIMD ("Additive Increase Multiplicative Decrease") congestion control principle.

If there is no CMR received in the shared structure or if the CMR does not contain an adaptation request (NO_REQ), then step 422 is implemented.

At 422, the sender checks whether a bitrate increase test should be implemented. It is checked that the conditions for activating an encoding bitrate increase test are met. More precisely, in the preferred embodiment, it is decided to test a bitrate increase at 422 if the following conditions are simultaneously met:

If the current bitrate $R_s$ is less than the maximum bitrate $R_s^{max}$ authorized in the session. If not, if $R_s=R_s^{max}$, no test is implemented (429). It is also possible to reinitialize $f_{burst}=1$.

If the time elapsed since the last CMR request received $T_{CMR}$ (defined as the number of frames since the last CMR) is greater than a predetermined time delay $\tau_{CMR}$ (for example 500 ms). $\tau_{CMR}=f_{burst}\tau_{burst}$ is adopted here; in some variants, it is possible for example to set $\tau_{CMR}=250$ frames of 20 ms (which corresponds to 5 seconds). If not, if the time required is insufficient ($T_{CMR} \leq \tau_{CMR}$), no test is implemented (429).

In some variants, it is also possible to add an additional condition:

If the evolution trend of the bitrate is stable with a positive trend compared to the bitrate history. It is possible for example to use simple linear regression on the estimated bandwidth as a function of the arrival time of the packets over a period of 500 ms to calculate a slope (see the estimate of the slope described above or the associated variants). If the slope exceeds a positive or zero threshold (for example 0), a redundancy test may be started in order to test the channel. If not, if the slope is negative, no test is implemented (429).

If a bitrate increase test ("burst") is to be activated (Y at 422), then the redundancy parameters to be applied at 423 are defined. It is checked:

Whether the encoder does not have redundancy in progress ($N_{burst}<0$; $N_{burst}$ representing the frame counter with redundancy) when encoding the current frame. If this is the case, then the following parameters are set: the offset of the redundancy at $K_{burst}$ (for example at 2) and the frame counter with redundancy is initialized at $N_{burst}=L_{burst}+K_{burst}$ with for example $L_{burst}$ at 100.

If the encoder has redundancy in progress ($N_{burst} \geq 0$) when encoding the current frame, then it is checked:
Whether the end of the current applied redundancy has been reached ($N_{burst}=0$). In this case, $K_{burst}=-1$ is set and $\tau_{CMR}=0$ is reinitialized.
If not: the frame counter with redundancy is decremented with $N_{burst}=N_{burst}-1$ At E427, the sender checks whether a CMR should be transported in the packet associated with the current frame to be encoded. If so, the data from the CMR in the "BW_Info" structure are extracted for subsequent encoding of the CMR.

The sender then creates the header of the current RTP payload, if the CMR and ToC fields are to be inserted into the current packet. For the CMR field, the reader is referred to tables A.2 and A.3 of Annex A of the 3GPP TS 26.445 specification for the construction and the encoding of the CMR field for the EVS codec based on the information on the CMR request (bitrate, encoded band, etc.) to be encoded. If a CMR field should be sent but the "updated" entry of the structure "BW_Info" has the value "false", the code NO_REQ will be used, which corresponds to T=111 and D=1111 (in binary). Similarly, the encoding of the ToC field is described in figure A.4 and tables A.4 and A.5 of Annex A of TS 26.445. According to the invention, if 100% redundancy is used in the current packet, the ToC field will simultaneously describe the bitrate of the current frame, the bitrate of the redundant frame and the redundancy offset $K_{burst}$ (using the appropriate number of ToCs associated with NO_DATA). It is recalled that examples of a redundant frame structure are given in chapter 10 of the 3GPP TS 26.114 specification and the construction of the ToC field follows the principles given in this specification for the AMR, AMR-WB and EVS codecs.

The current frame is encoded at 427 and added to the data of the packet.

If redundancy is activated (Y at 422), the redundant encoded frame corresponding to the offset $K_{burst}$ (stored in a queue or other data structure) is also added to the data of the current packet to be transmitted at 428.

The packet thus formed with the headers (if present) and encoded data is transmitted (428) using the information relating to the size of the RTP payload and the number of frames encoded since the reception of the last CMR is incremented by 1 ($T_{CMR} \leftarrow T_{CMR}+1$). The current encoded frame is stored in a queue for possible later use as a redundant frame.

It will be noted that it is not always possible to double the encoding bitrate, if the SDP session (with the parameter b=AS) or the quality of service parameters (GBR and MBR on a VoLTE mobile network) limit the maximum bitrate usable by the codec.

In some variants of the invention, the definition of an SDP parameter of the type b=AS limiting the maximum bitrate usable by the codec will for example be taken into account. For example, in the case of the EVS SWB codec, it is possible to have a parameter b=AS limiting the bitrate to 24.4 kbit/s (at transmission of a single frame of 20 ms). In this case, according to the invention, the use of redundancy may be limited in two ways:

if the network does not reject the packets on the basis of the instantaneous bitrate (for example a bitrate greater than 24.4 kbit/s) but using a sliding average of the bitrate over a time window (for example of a duration of 2 seconds as indicated in section 7.5.5.1 of the 3GPP TS 26.114 specification), it is possible to keep the embodiment of alternate transmission of packets with or without redundancy, that is to say use intermittent redundant transmission for the bitrate increase test. The transmission frequency of the redundant packets is then adapted to this maximum bitrate constraint. One variant of the first embodiment is described below for this case.

if no packet may exceed a size limit corresponding to the maximum bitrate (for example a size corresponding to 24.4 kbit/s), it is possible to test for example 2×9.6 kbit/s but not 2×13.2 kbit/s, and it is thus possible to change to the bitrates of 13.2 or 16.4 kbit/s, which are between 9.6 and 2×9.6 kbit/s; on the other hand, it will be difficult to test the change to 24.4 kbit/s, unless alternating between encoding at 9.6 and encoding at 13.2 and associating an encoded frame and a redundant frame for a bitrate of around 9.6+13.2 kbit/s. In any case, this variant means that, before applying redundancy, a reduction of the bitrate to a lower discrete bitrate should potentially be performed (for example to test whether it is possible to change from 13.2 to 16.4 or from 16.4 to 24.4 kbit/s). A bitrate (for example 9.6 kbit/s) lower than the current bitrate (for example 13.2 or 16.4 kbit/s) will be used. Specifically, it would not be possible to use 2×13.2 kbit/s, because this would exceed the bitrate of 24.4 kbit/s and only the cases 2×9.6 kbit/s and 9.6+13.2 kbit/s will be authorized.

In some variants of the invention according to the first embodiment, the activation of redundancy may be authorized only during active signal periods in order to minimize the impacts of the bitrate increase.

A description has been given above of a bitrate increase test with 100% redundancy, that is to say redundancy for each packet transmitted during a determined number of frames ($L_{burst}$). In some variant embodiments, such as for the second embodiment described below, redundancy will be activated only intermittently. For the sake of simplification, redundancy "frequency" will be the name given to the period with which a redundant packet is used—thus a frequency of x means that a redundant frame is inserted every x packets.

Rather than (approximately) doubling the encoding bitrate, redundancy is used for example every 2 or 3 packets, thereby making it possible to obtain on average a relative increase in fractional bitrate, in order to test (on average) the change to the immediately higher discrete bitrate and not double the bitrate.

For example, if the bitrate is 9.6 kbit/s, activating redundancy increases the instantaneous peak bitrate to approximately 2×9.6 kbit/s, but the actual average bitrate on the channel will be (freq+1)/freq×9.6, that is to say 2×9.6 (approx. 19.2) if freq=1, 1.5×9.6 (approx. 14.4) if freq=2, 4/3×9.6 (approx. 12.8) if freq=3.

The redundancy offset is set to the same value as the frequency parameter (freq) so that redundancy is able to be used.

This other parameter defining the redundancy may be determined in step 423 of FIG. 4c on the basis of information on the current bitrate and the immediately higher bitrate. For example, if the 9.6 to 24.4 kbit/s bitrate range is able to be used in a session with the EVS codec in Super-Wideband mode, it is possible to use:

starting from a bitrate of 9.6 kbit/s, the bitrate increase test may be performed with a redundant frame encoded at 9.6 kbit/s every 2 packets (so as to arrive at an average bitrate on the channel close to 14.4 kbit/s) or every 3 packets (approximately 12.8 kbit/s)

starting from a bitrate of 13.2 kbit/s, the bitrate increase test may be performed with a redundant frame encoded at 13.2 kbit/s every 3 packets (approx. 17.6 kbit/s) or every 4 packets (approx. 16.5 kbit/s)

starting from a bitrate of 16.4 kbit/s, the bitrate increase test may be performed with a redundant frame encoded at 16.4 kbit/s every 2 packets (approx. 24.6 kbit/s)

The redundancy sending frequency is therefore adaptive, depending on the current bitrate. It is 2 or 3 at 9.6 kbit/s, 3 or 4 at 13.2 kbit/s, 2 at 16.4 kbit/s.

The redundancy offset will preferably be defined as being equal to the sending frequency of the redundant packets in order to compensate possible losses of larger packets. In some variants, it will be possible to use another offset to repeat for example the frame that immediately follows the packet with redundancy.

More generally, the frequency may be chosen on the basis of the current discrete bitrate D0 and the immediately higher discrete bitrate D1 for a given codec, such as the integer value closest to 1/(D1/D0−1).

By way of example, consideration is given to the following cases (Table 1), which will be used preferably in this variant of the first embodiment:

TABLE 1

| D0 | D1 | 1/(D1/D0 − 1) | freq |
|---|---|---|---|
| 9.6 | 13.2 | 2.66 | 3 |
| 13.2 | 16.4 | 4.125 | 4 |
| 16.4 | 24.4 | 2.05 | 2 |

A second embodiment is presented next, in which the sender and the receiver still act in a coordinated manner but in which this time the receiver sends an explicit request to activate 100% redundancy in order to test a bitrate increase, by way of an extended CMR request. This description assumes a maximum bitrate of 24.4 kbit/s and a value of b=AS corresponding to this maximum bitrate.

In this embodiment, the existing CMR codes of the EVS codec (as defined in table A.3 of the 3GPP TS 26.445 specification) are used to send a request to a given encoding bitrate, when this involves lowering or increasing the bitrate on the basis of the estimated available bandwidth. However, a non-conventional CMR, called extended CMR, is necessary to send a redundancy activation request, because the existing CMR codes of the EVS codec only allow adaptation in terms of bitrate, audio band and control of a special partial redundancy mode at 13.2 kbit/s (called "channel-aware mode"). It is assumed that the SDP session includes an additional parameter called "adapt", without loss of generality, in order to signal and authorize the use of such an extended CMR, and that both terminals are compatible with the SDP parameter "adapt". To indicate the activation of a bitrate increase test step through transmission of redundant packets, for example, 100% redundancy, in the case of the EVS codec, according to this embodiment, CMR codes are used that are free, left for future use or reserved and that are not currently used in the specifications of the EVS codec.

By way of example, consideration is given to the following codes (Table 2):

TABLE 2

| CMR code (H T D) | EVS request |
|---|---|
| 1 111 0000 | RED 2 × 9.6-SWB, freq. 1, offset = 1 |
| 1 111 0001 | RED 2 × 9.6-SWB, freq. 2, offset = 2 |
| 1 111 0010 | RED 2 × 9.6SWB, freq. 3, offset = 3 |
| 1 111 0011 | RED 2 × 13.2-SWB, freq. 1, offset = 1 |
| 1 111 0100 | RED 2 × 13-2-SWB, freq. 2, offset = 2 |
| 1 111 0101 | RED 2 × 13.2-SWB, freq. 3, offset = 3 |
| 1 111 0110 | reserved |
| 1 111 0111 | reserved |
| 1 111 1000 | reserved |
| 1 111 1001 | reserved |
| 1 111 1010 | reserved |
| 1 111 1011 | reserved |
| 1 111 1100 | reserved |
| 1 111 1101 | reserved |
| 1 111 1110 | reserved | in which 100% redundancy is activated by the sender intermittently every 1, 2 or 3 packets (depending on the sending frequency) in order to increase the bitrate.

For example, if the bitrate is 9.6 kbit/s, activating redundancy increases the instantaneous peak bitrate to approximately 2×9.6 kbit/s, but the actual average bitrate on the channel will be (freq+1)/freq×9.6, that is to say 2×9.6 (approx. 19.2) if freq=1, 1.5×9.6 (approx. 14.4) if freq=2, 4/3×9.6 (approx. 12.8) if freq=3.

The offset is set to the same value as the frequency (freq) so that redundancy is able to be used. In some variants, another convention may be defined to set the offset value.

The details of CMR construction or extraction are not described here according to table 2. However, it is assumed that the structure "CMR_Req" contains a field called "burst_uplink" that is set to "1", "2" or "3" when extended CMR codes according to table 2 are used, otherwise its value is set to "−1". Thus, by combining the "requested_bitrate" entry and this "burst_uplink" entry, it is possible to completely signal the type of request to be sent or request received.

One important feature of this second embodiment over the conventional use of 100% redundancy is that the redundancy is preferably intermittent: rather than (approximately) doubling the encoding bitrate, the redundancy is used adaptively for example every 1, 2 or 3 packets, thereby making it possible to obtain on average a fractional bitrate increase, in order to test (on average) the change to the immediately higher discrete bitrate and not double the bitrate. More generally, the frequency may be chosen on the basis of the current discrete bitrate D0 and the immediately higher discrete bitrate D1 for a given codec, such as the integer value closest to 1/(D1/D0−1).

If the instantaneous peak bitrate may not exceed the maximum bitrate authorized in the session (for example 24.4 kbit/s), only requests associated with 9.6 kbit/s with different frequency values will be used (freq=1, 2 or 3), in the knowledge that it will be difficult in this case to test a bitrate close to 24.4 kbit/s because the frequency freq=1 gives a bitrate around 19.2 kbit/s. If not, it is also possible to authorize requests associated with the bitrate of 13.2 kbit/s, thereby making it possible to test bitrates of approximately (freq+1)/freq×13.2, that is to say 2×13.2 (approx. 26.4) if freq=1, 1.5×13.2 (approx. 19.8) if freq=2, 4/3×13.2 (approx. 17.6) if freq=3.

Starting from the estimated bandwidth—instantaneously or over a past horizon given by the history—and potentially using additional information such as the packet loss rate measured at reception (where the estimated bandwidth will be multiplied by a factor <1 such as 0.9 as soon as the rate is for example >10%), a bitrate adaptation request is determined and encoded in a CMR code (blocks 302 and 352 of FIG. 3). This CMR request is added by the local sender to the next packet to be transmitted.

According to the invention, three types of adaptation request decision to be sent for the bitrate adaptation are defined:
 "SET_RATE" decision: in this case, a CMR is sent that indicates an encoding bitrate that corresponds to the estimated bandwidth if the current bitrate is not within an interval around this estimated bandwidth;
 "NO_REQ" decision: the current bitrate is kept if the bitrate to be used remains unchanged
 in this case, a CMR indicating the current bitrate may be sent;
 "USE_RED" decision: a CMR is sent indicating that 100% redundancy should be activated at sending—in one preferred embodiment, redundancy is used adaptively—with an adaptive offset linked to the encoding bitrate—to test the change to the bitrate immediately higher than the current bitrate (with a variable sending frequency); in some variants it may be contemplated to activate redundancy for continuous use—with freq=1 and offset=1—until quality problems are detected. This allows a rapid rise in the bitrate, but preference will generally be given to a gradual rise in increments in order to test the higher bitrates one by one.

For AMR and AMR-WB codecs which work with in-band feedback through CMR, the meaning of CMR NO_REQ is different from that of EVS, NO_REQ indicates the authorized maximum bitrate. In some variants using these codecs, the NO_REQ decision will therefore be replaced with a SET_RATE decision to indicate the current bitrate. In some variants of the invention using EVS, it is possible in the same way to replace the NO_REQ decision with a SET_RATE decision to indicate the current bitrate.

According to this second embodiment, reserved CMR codes are used, which justifies the name extended CMR (Ext. CMR) in blocks 307 and 357 in FIG. 3. The extended CMR codes are used to indicate an adaptation request to increase the encoding bitrate, this request tells the remote sender to test a bitrate higher than this bitrate given in the request—in this case the sender will activate transmission at this given bitrate with 100% redundancy by transmitting redundant packets.

This request assumes the use of redundancy on the sender side. In one simplified embodiment, the sender may execute the request from the CMR as in the first embodiment of the invention, by checking that the "updated" input is at "true" in the structure "CMR_Req" and by applying the adaptation parameters contained in "CMR_Req"; after retrieving the parameters, the value of "updated" is reset to "false". In one preferred embodiment, the sender will be allowed sufficient flexibility to execute the redundancy activation request on the basis of the signal currently being encoded. As explained below, the bitrate increase may result in congestion, with packet loss or an increase in jitter, and it is therefore important, when the available bandwidth is not known and tested blind (to estimate the "bottleneck" in the downlink direction), not to exceed this limit excessively on the channel; moreover, the impact of losses and jitter is different depending on the types of encoded frames; for the inactive parts or the less sensitive parts of the active speech, these degradations may be tolerated more easily.

Figure 5A:
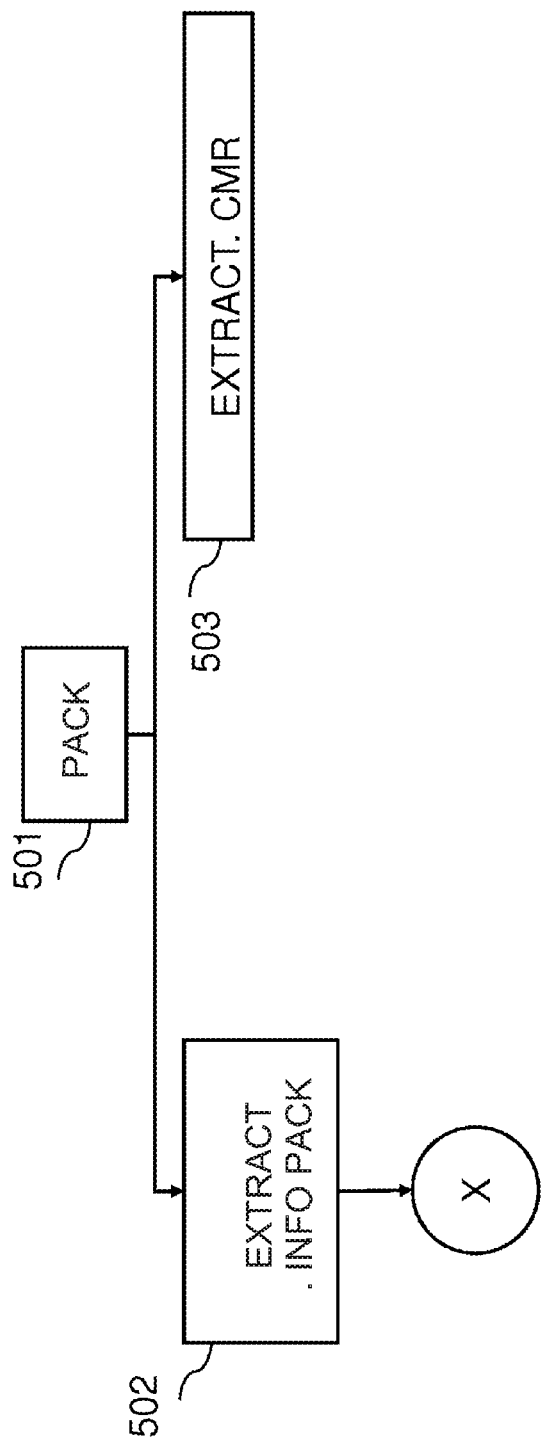
FIGS. 5a and 5c illustrate, in the form of flowcharts, the steps of a method for adapting an encoding bitrate in a second embodiment of the invention as well as the steps of a method for determining a bitrate adaptation request according to one embodiment of the invention.

For this second embodiment, FIG. 5a picks up, from the first embodiment, from the extraction steps performed at the receiver. Thus, upon reception of a packet at 501, two items of information are extracted at the receiver:
 transmission information for the current packet, allowing estimation of the available bandwidth (at 502) according to one of the estimation methods described above. The extraction of this information is followed by the steps X described with reference to FIG. 5b;
 information on the type of adaptation requested from the CMR request sent by the other end of the communication (at 503).

The main difference with FIG. 4a relates to the fact that the CMR request may correspond to an extended CMR, whereas in FIG. 4a a "conventional" CMR request is assumed; moreover, steps X also include the possibility of deciding to send an extended request to activate redundancy using the "burst_uplink" entry.

Figure 5B:
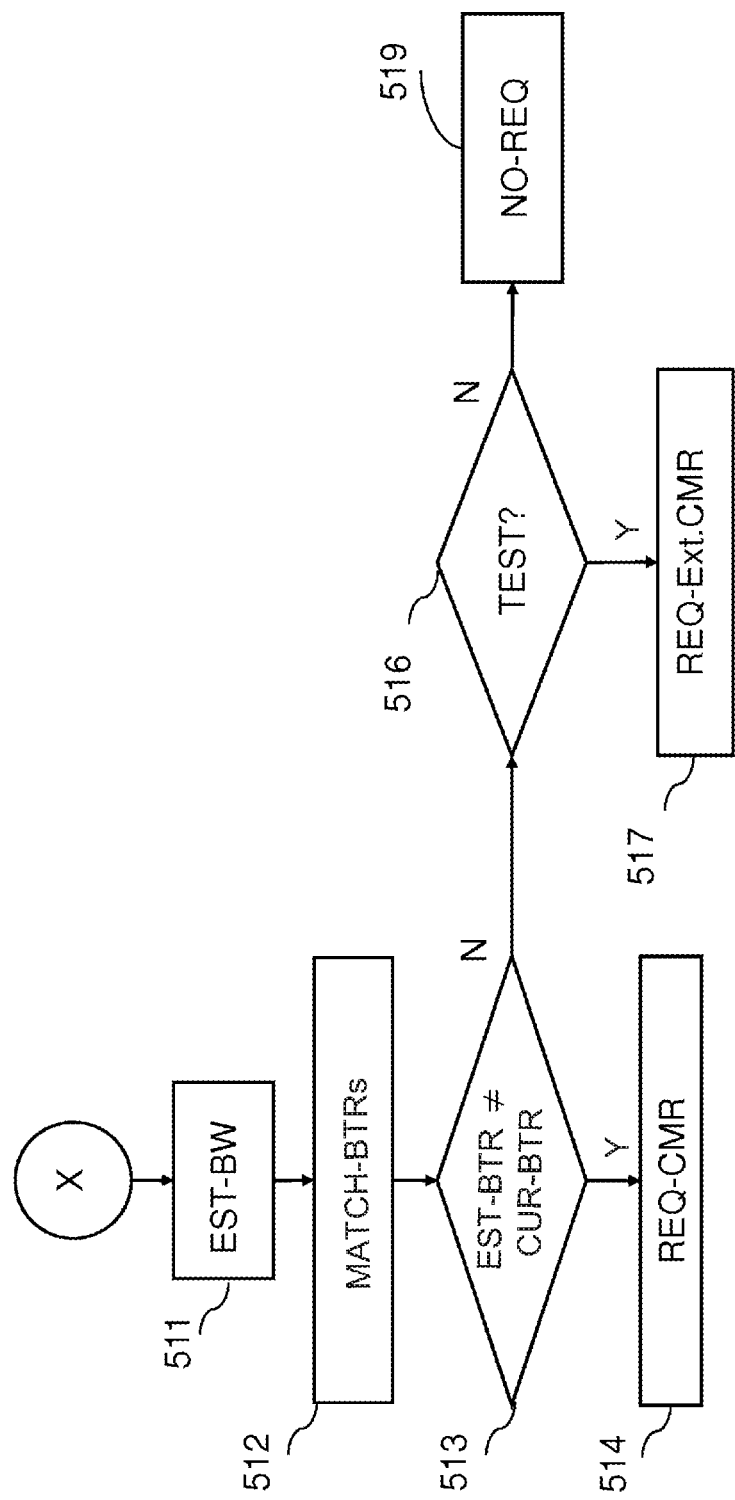

FIG. 5b describes the steps X implemented by the receiver device after extracting the information on the current packet (502).

In the same way as for the first embodiment, the bandwidth is estimated according to one of the methods described above (at 511). Next, mapping between the estimated bandwidth and the discrete EVS bitrates is performed (at 512) as described above in order to determine whether it is necessary to change the current reception bitrate and whether it is possible to change from one discrete bitrate to another.

If the bitrate determined according to the bandwidth estimated in the last packet received is different from the current bitrate (Y at 513), the "SET_RATE" decision is taken to change the bitrate according to this new bitrate. A conventional request to change the bitrate to a corresponding discrete bitrate is defined in step 514; the associated data are written to the shared structure "BW_info", so that the sender is then able to encode the mapping request with the frame to be sent.

If the new bitrate is the same as the current bitrate, then a step of checking test application conditions is performed at 516.

This checking step 516 checks the bandwidth estimate history and thus measures a variation trend in the estimated bandwidth. If this trend is positive (Y at 516), that is to say if the estimated bandwidth tends to increase, then a "USE_RED" decision may be taken and step 517 is then implemented.

If not (N at 516), if the trend is negative, then there is no sending of a request, the decision "NO_REQ" is taken and the data associated with the CMR are written to the shared structure "BW_info".

To measure the variation trend, it is possible for example to use simple linear regression on the estimated bandwidth as a function of the arrival time of the packets over a period of 500 ms to calculate a slope, as described previously.

The time for which this "NO-REQ" decision remains selected may be measured in order to decide whether or not a bitrate increase test should be activated. If this elapsed time is less than a threshold (for example 500 ms), then a "NO_REQ" decision is taken (N at 516). The "NO-REQ" mode was not long enough. In this case, no request (no CMR) or a CMR indicating NO_REQ will typically be sent at 519—in the latter, the data associated with the CMR NO_REQ are written to the shared structure "BW_info".

In some variants, it is possible to reuse the criteria for triggering (activating) the bitrate increase test of the first embodiment.

In some variants, the NO_REQ decision will be replaced with a SET_RATE decision at the current bitrate, in an equivalent manner. It will be noted that, for AMR and AMR-WB codecs, the CMR is systematically present in each packet, and the NO_REQ case may be replaced with the current bitrate.

Conversely (Y at 516), when the elapsed time is greater than the threshold, the "USE_RED" decision is taken in order to request a bitrate increase test. In this case, in step 517, an extended CMR request is prepared, by writing the data associated with the extended CMR to the shared structure "BW_info".

FIG. 5c describes the operation of the sender upon reception of a CMR request (normal or extended, other than NO_REQ). The steps that have remained identical to the sender with reference to FIG. 4c are not repeated here for the sake of simplification.

Two possible cases arise in the step of checking whether a CMR field has been received. Thus, if the CMR field contains a conventional bitrate adaptation request or an extended CMR request, the encoding and sending parameters are set as in the first embodiment. However, the sender may be allowed to decide when to activate redundancy.

With reference to FIG. 5c, in step 521, it is checked whether a conventional bitrate change CMR has been received ("updated" at "true" and "burst_uplink"=−1) and whether a test step through transmission of redundancy packets is in progress ($N_{burst} \geq 0$). If so (Y at 521), the test step is stopped and redundancy is deactivated at 522, as described above in the first embodiment.

If there is no test step in progress (N at 521)—if $N_{burst} < 0$—, then step 523 is implemented.

In step 523, it is checked whether an extended CMR request has been received ("updated" at "true" and "burst_uplink>0" in the structure "CMR_Req"). If so (Y at 523), the sender implements a bitrate increase test step by transmitting redundant packets at 524 on the basis of the information contained in the structure "CMR_Req". The bitrate is also set in order to encode the next frame on the basis of the received CMR (at 525).

In some variants, the above algorithm may be supplemented so as also to use the packet loss rate. This adds additional conditions in order in particular to lower the bitrate in the event of significant losses (>=10%) and/or switch to a more robust mode (such as channel-aware mode) if it is less than or equal to the current bitrate, or avoid the USE_RED decision in case of losses >=10%.

In some variants, it is possible to use partial redundancy, as explained above, instead of 100% redundancy, and it is also possible to use higher redundancy, not limited to 100%, for example 200 or 300% redundancy.

In some variants, it is also possible to use audio or video codecs that do not have the "in-band" CMR signaling mechanism as defined above, and in this case it is possible to use RTCP packets to indicate requests equivalent to the CMR used in the embodiments of the invention.

Figure 6:
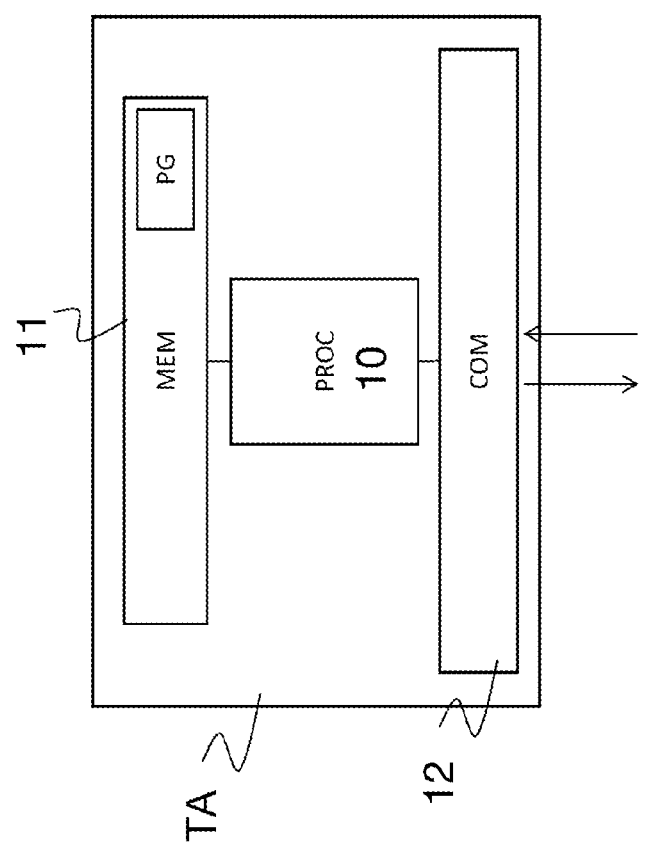
FIG. 6 illustrates a hardware example of a communication terminal incorporating a sender device and a receiver device, according to one embodiment of the invention.

FIG. 6 illustrates a hardware example of a communication terminal TA comprising a receiver device and a sender device able to implement the methods for bitrate adaptation and for determining an adaptation request according to the various embodiments of the invention.

The terminal TA comprises a storage space 11, for example a memory MEM, a processing unit 10 comprising a processor P, driven by a computer program PG, stored in the memory 11 and implementing the steps of the bitrate adaptation method and/or of the method for determining a bitrate adaptation request within the meaning of the invention, and in particular the test step of increasing the encoding bitrate implemented by a sender device by transmitting at least one redundant packet according to selected transmission parameters when these instructions are executed by the processor P.

Typically, the description of FIGS. 4a to 4c and of FIGS. 5a to 5c picks up from the steps of the algorithms of such computer programs.

On initialization, the code instructions of the program PG are for example loaded into a RAM memory (not shown) before being executed by the processor P of the processing unit 10. The program instructions may be stored on a storage medium such as flash memory, a hard disk or any other non-transient storage medium.

The terminal TA comprises a communication module 12 able to receive the voice packets from an IP network and to transmit voice packets to the IP network with redundancy in order to test a bitrate increase according to the invention.

The terminal comprises a sender device comprising a packet transmission unit able to implement a test step of increasing the encoding bitrate by transmitting at least one redundant packet according to selected transmission parameters.

The terminal also comprises a receiver device that, according to one embodiment, comprises an estimation module able to estimate an available bandwidth and a module for constructing and transmitting an adaptation request, able to construct and transmit, to a sender device, a request to implement a test step of increasing the encoding bitrate by transmitting redundant packets according to selected transmission parameters.

These modules are as described with reference to FIG. 3.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same way, a hardware component corresponds to any element of a hardware assembly able to implement a function or a set of functions for the module in question (integrated circuit, chip card, memory card, etc.).

The terminal is for example a telephone, a smartphone, a tablet, a computer, a home gateway or a connected object.

ANNEX 1:
EVS_D (0 to 8)=(9600, 13200, 16400, 24400, 32000, 48000, 64000, 96000, 12800)
For i=0 to 8:
If EVS_D(i)>B−(EVS_D(i+1)−EVS_D(i))/2:
  Exit the "For" loop
End If
i=i+1
End For
If i==9: D=EVS_D(i−1)
Else D=EVS_D(i)

Although the present disclosure has been described with reference to one or more examples, workers skilled in the art will recognize that changes may be made in form and detail without departing from the scope of the disclosure and/or the appended claims.

The invention claimed is:

1. A method comprising:
   adapting an encoding bitrate of real-time signals of a real-time communication session between a sender device and a receiver device of communication terminals, the sender device comprising a multi-bitrate encoder using a set of discrete bitrates, wherein the adapting comprises:
   a test step of increasing the encoding bitrate at the sender device by transmitting a current frame and at least one copy of a previous frame with a chosen redundancy offset; and
   implementing the test step in response to a time delay reaching a threshold since a last adaptation request received from the receiver device.

2. The method as claimed in claim 1, wherein the test step is implemented for as long as no bitrate adaptation request is received from the receiver device.

3. The method as claimed in claim 1, comprising implementing the test step after a bitrate change to a lower discrete bitrate.

4. The method as claimed in claim 1, wherein the time delay for triggering the test step is adapted on the basis of information on available bandwidth estimated at the receiver device.

5. The method as claimed in claim 1, comprising implementing the test step on the basis of obtained information on evolution of the encoding bitrate.

6. The method as claimed in claim 5, wherein the information on the evolution of the encoding bitrate is obtained from a history of available bandwidth estimated at the receiver device.

7. The method as claimed in claim 1, comprising implementing the test step after reception of an adaptation request, which is received from the receiver device and which comprises a request to implement said test step according to selected transmission parameters.

8. The method as claimed in claim 7, wherein the adaptation request is determined at the receiver device on the basis of information on evolution of an estimated available bandwidth.

9. A sender device of a communication terminal able to implement real-time communication sessions and comprising:
   a multi-bitrate encoder using a set of discrete bitrates, which comprises a packet transmission unit configured to implement, in response to a time delay reaching a threshold since a last adaptation request received from a receiver device, a test step of increasing an encoding bitrate by transmitting a current frame and at least one copy of a previous frame with a chosen redundancy offset.

10. A non-transitory computer-readable storage medium storing a computer program comprising instructions for executing an adaptation method when the instructions are executed by a processor of a sending device, wherein the instructions configure the sending device to:
   adapt an encoding bitrate of real-time signals of a real-time communication session between a sender device and a receiver device of communication terminals, the sender device comprising a multi-bitrate encoder using a set of discrete bitrates, by:
   implementing, in response to a time delay reaching a threshold since a last adaptation request received from the receiver device, a test step of increasing the encoding bitrate at the sender device by transmitting a current frame and at least one copy of a previous frame with a chosen redundancy offset.

* * * * *